US007539591B2

(12) United States Patent
House et al.

(10) Patent No.: US 7,539,591 B2
(45) Date of Patent: May 26, 2009

(54) ENTERPRISE TEST DATA MANAGEMENT SYSTEM UTILIZING HIERARCHICAL TEST DATA MODELS AND RELATED METHODS

(75) Inventors: Richard W. House, Austin, TX (US); Cesar R. Gamez, Pflugerville, TX (US); Chris Neil, Cedar Park, TX (US); Chandrasekhar Venkatraman, Hyderabad (IN)

(73) Assignee: VI Technology, Inc., Austin, TX (US)

( * ) Notice: Subject to any disclaimer, the term of this patent is extended or adjusted under 35 U.S.C. 154(b) by 671 days.

(21) Appl. No.: 11/112,083

(22) Filed: Apr. 22, 2005

(65) Prior Publication Data

US 2005/0268171 A1 Dec. 1, 2005

Related U.S. Application Data

(63) Continuation-in-part of application No. 11/012,772, filed on Dec. 15, 2004, now abandoned, which is a continuation of application No. 10/225,825, filed on Aug. 22, 2002, now Pat. No. 7,113,883.

(60) Provisional application No. 60/570,702, filed on May 14, 2004, provisional application No. 60/314,922, filed on Aug. 24, 2001.

(51) Int. Cl.
*G06F 19/00* (2006.01)

(52) U.S. Cl. .................................... 702/122

(58) Field of Classification Search ............ 702/80, 702/81, 118–123, 183, 184, 188; 714/30, 714/38, 724, 726, 733; 716/4; 717/102, 717/106, 107, 108; 709/204; 707/10, 104.1, 707/200

See application file for complete search history.

(56) References Cited

U.S. PATENT DOCUMENTS

| 4,493,079 | A | 1/1985 | Hughes, Jr. | 371/27 |
| 4,748,573 | A | 5/1988 | Sarandrea et al. | 364/551 |
| 5,021,997 | A | 6/1991 | Archie et al. | 364/900 |
| 5,150,288 | A | 9/1992 | Imai et al. | 364/132 |
| 5,164,912 | A | 11/1992 | Osborne et al. | 364/580 |
| 5,206,582 | A | 4/1993 | Ekstedt et al. | 324/73.1 |
| 5,311,438 | A | 5/1994 | Sellers et al. | 364/468 |
| 5,355,320 | A | 10/1994 | Erjavic et al. | 364/488 |

(Continued)

*Primary Examiner*—Edward Raymond
*Assistant Examiner*—Mohamed Charioui
(74) *Attorney, Agent, or Firm*—O'Keefe, Egan, Peterman & Enders, LLP

(57) ABSTRACT

Test data model and test data structure creation improvements are disclosed for enterprise test data management systems in the test, measurement and automation environment. A hierarchical test data model for a plurality of test systems includes hierarchical data objects configured to store test data related information. In addition, one or more data objects within the test data model are linked such that data entered into one object can be used by another object or can be automatically propagated to linked objects. And default data object properties are defined such that each new data object includes the default properties. Still further, a graphical user interface (GUI) can be provided through which information can be input to the database where the GUI includes a first frame showing a structure for the hierarchical test data model and a second frame automatically showing one or more data input fields related to an object selected within the first frame. Related systems and methods are also disclosed.

28 Claims, 21 Drawing Sheets

U.S. PATENT DOCUMENTS

| | | |
|---|---|---|
| 5,751,941 A | 5/1998 | Hinds et al. .................. 714/38 |
| 5,777,876 A | 7/1998 | Beauchesne ........... 364/468.01 |
| 5,822,717 A | 10/1998 | Tsiang et al. ............... 702/108 |
| 5,845,234 A | 12/1998 | Testa et al. .................. 702/119 |
| 6,023,694 A | 2/2000 | Kouchi et al. .................. 707/2 |
| 6,165,401 A | 12/2000 | Schlossniki et al. ......... 264/154 |
| 6,167,401 A | 12/2000 | Csipkes et al. ............... 707/10 |
| 6,182,075 B1 | 1/2001 | Hsu ............................. 707/10 |
| 6,236,952 B1 | 5/2001 | Jun et al. .................... 702/119 |
| 6,381,604 B1 | 4/2002 | Caughran et al. ............ 707/10 |
| 6,393,435 B1 | 5/2002 | Gartner et al. .............. 707/200 |
| 6,434,502 B1 | 8/2002 | Harrison .................... 702/122 |
| 6,442,714 B1 | 8/2002 | Griffin et al. ................. 714/46 |
| 6,473,707 B1 | 10/2002 | Grey .......................... 702/123 |
| 6,507,842 B1 | 1/2003 | Grey et al. ..................... 707/5 |
| 6,546,524 B1 | 4/2003 | Chankramath et al. ......... 716/4 |
| 6,615,153 B2 | 9/2003 | Liu et al. .................... 702/121 |
| 6,633,878 B1 | 10/2003 | Underwood ................ 707/100 |
| 6,681,351 B1 * | 1/2004 | Kittross et al. .............. 714/724 |
| 6,714,965 B2 | 3/2004 | Kakuta et al. ............... 709/204 |
| 6,779,134 B1 | 8/2004 | Laviolette et al. ............. 714/38 |
| 6,799,147 B1 | 9/2004 | Balasubramanian et al. 702/186 |
| 2001/0012986 A1 | 8/2001 | Conan et al. ................ 702/188 |
| 2001/0037374 A1 | 11/2001 | Shrum et al. ................ 709/217 |
| 2001/0054044 A1 | 12/2001 | Liu et al. .................. 707/104.1 |
| 2003/0040897 A1 | 2/2003 | Murphy et al. ................ 703/18 |

* cited by examiner

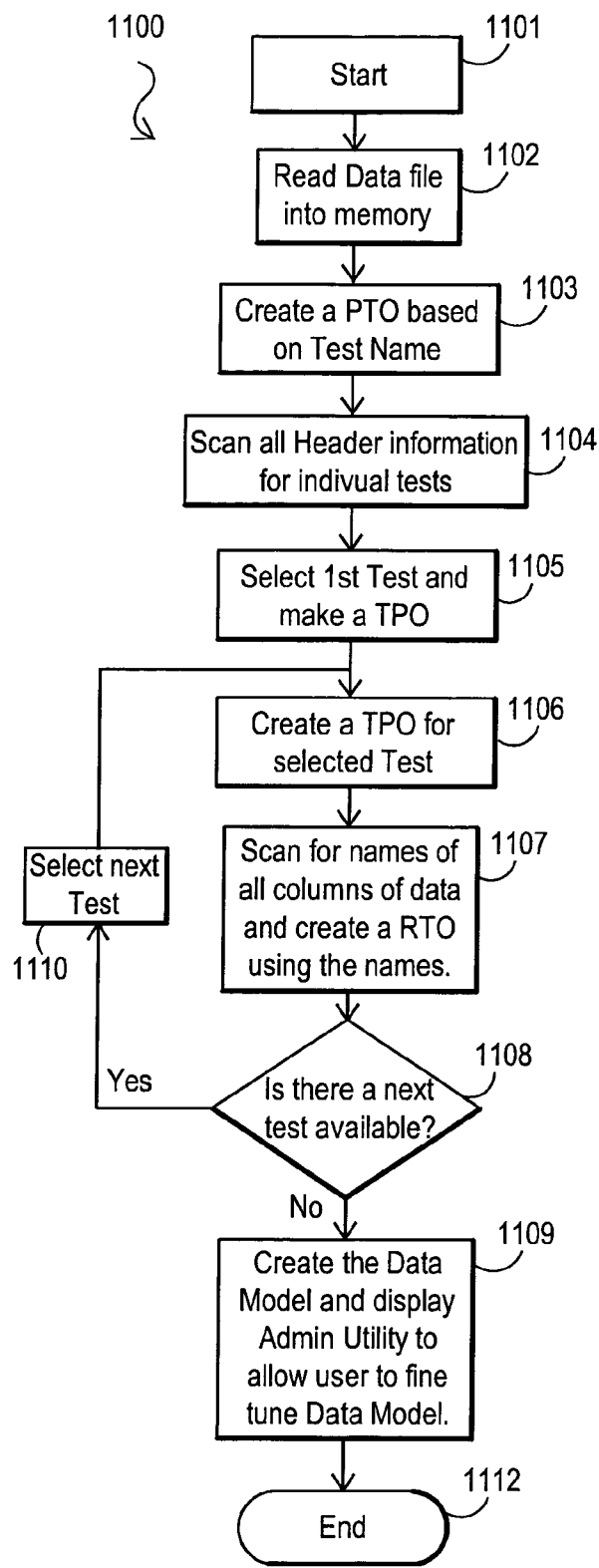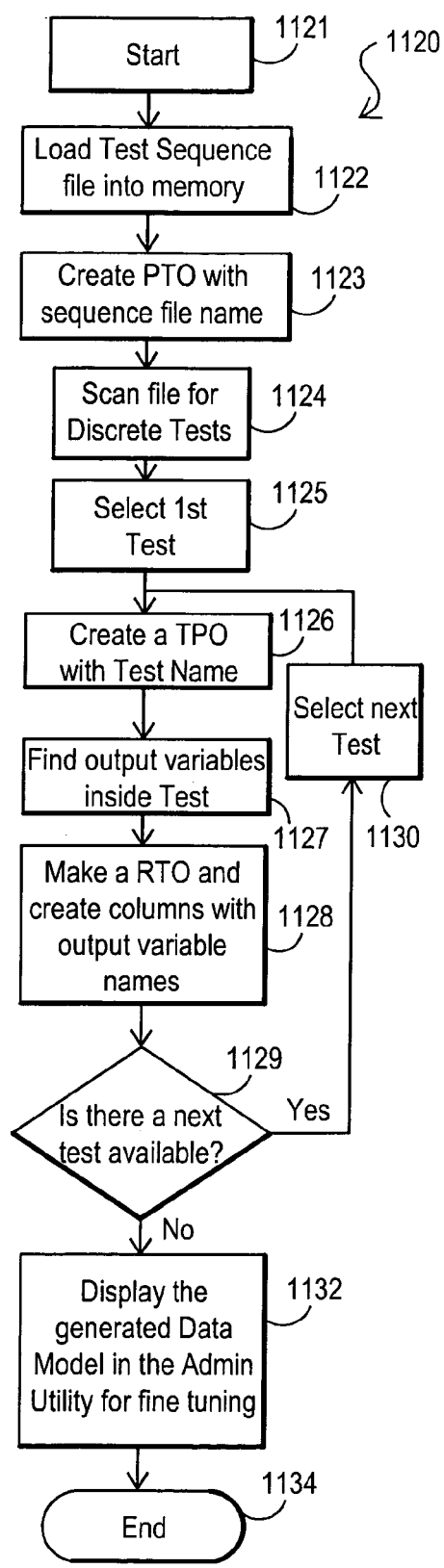
FIG. 11A
FIG. 11B

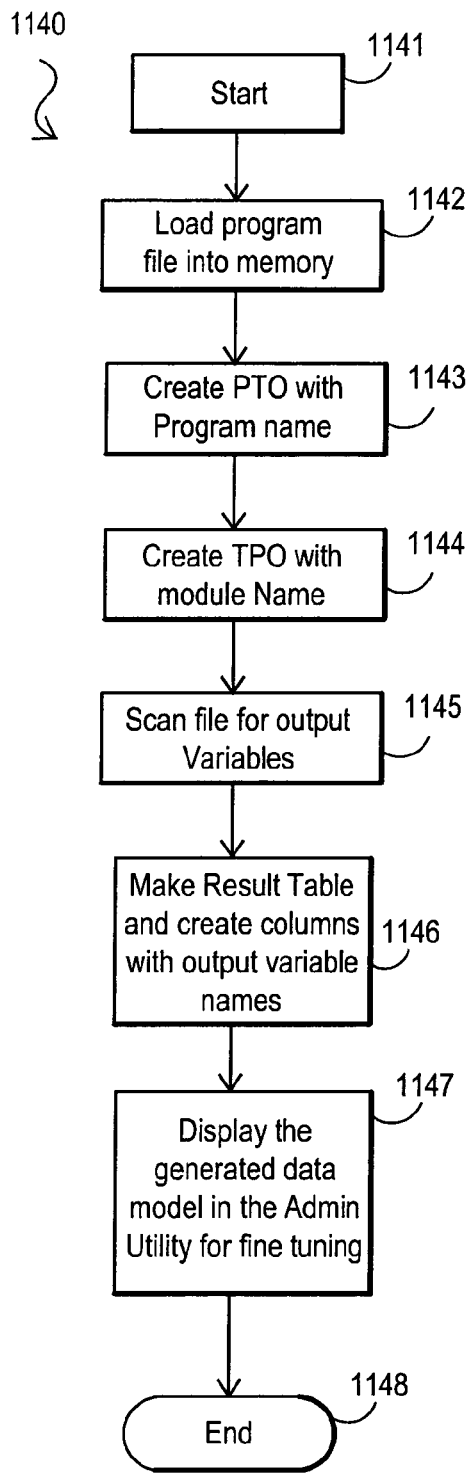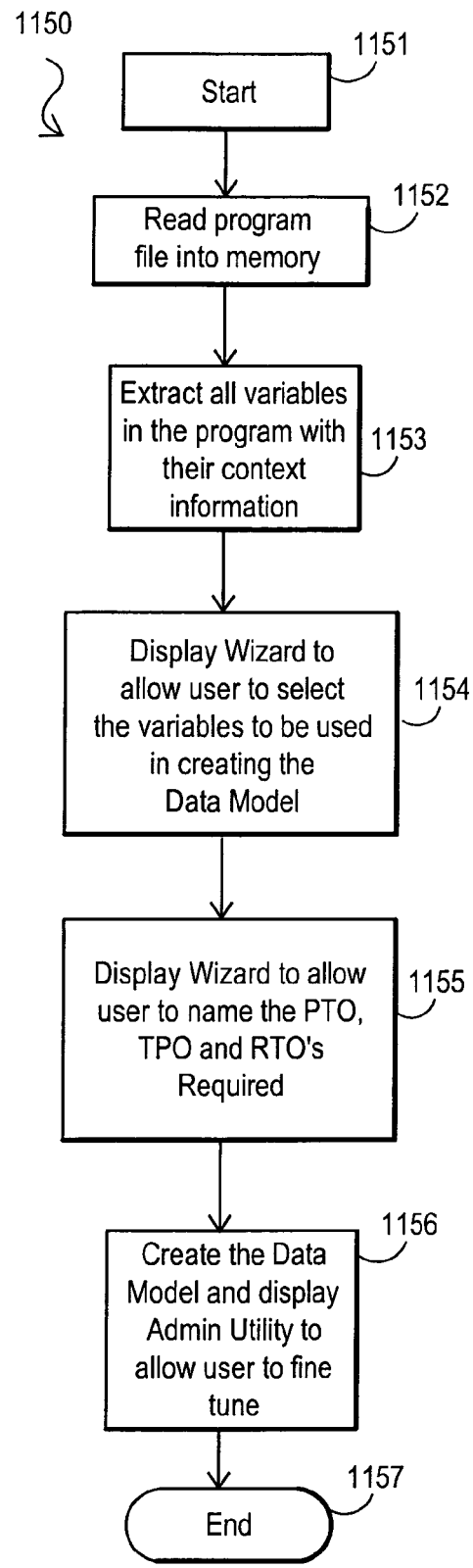
FIG. 11C
FIG. 11D

ENTERPRISE TEST DATA MANAGEMENT SYSTEM UTILIZING HIERARCHICAL TEST DATA MODELS AND RELATED METHODS

RELATED APPLICATION

This application is a continuation-in-part application of the following application: application Ser. No. 11/012,772 filed Dec. 15, 2004, now abandoned which is entitled "TEST CONFIGURATION AND DATA MANAGEMENT SYSTEM AND ASSOCIATED METHOD FOR ENTERPRISE TEST OPERATIONS," which in turn is a continuation of application Ser. No. 10/225,825 filed on Aug. 22, 2002, now U.S. Pat. No. 7,113,883 which is entitled "TEST CONFIGURATION AND DATA MANAGEMENT SYSTEM AND ASSOCIATED METHOD FOR ENTERPRISE TEST OPERATIONS," which in turn claimed priority to Provisional Application Ser. No. 60/314,922 entitled "TEST CONFIGURATION AND DATA MANAGEMENT SYSTEM AND ASSOCIATED METHOD FOR ENTERPRISE TEST OPERATIONS," which was filed on Aug. 24, 2001, each of which is hereby incorporated by reference in its entirety. This application also claims priority to the following provisional application: Provisional Application Ser. No. 60/570,702 filed May 14, 2004, which is entitled "TEST CONFIGURATION AND DATA MANAGEMENT SYSTEM AND ASSOCIATED METHOD FOR ENTERPRISE TEST OPERATIONS," which is hereby incorporated by reference in its entirety. This application is also related to concurrently filed application Ser. No. 11/112,171entitled "ENTERPRISE TEST DATA MANAGEMENT SYSTEM UTILIZING AUTOMATICALLY CREATED TEST DATA STRUCTURES AND RELATED METHODS."

TECHNICAL FIELD OF THE INVENTION

This invention relates to configuration and management techniques for device and product test operations in test, measurement and automation environments.

BACKGROUND

Many companies, and specifically electronic and semiconductor device companies, produce products that must be tested to meet various specifications before the products can be shipped to customers. These test operations often include a variety of different test activities in a variety of different environments. The need exists, therefore, for efficient test configuration and data management among these disparate test operations, particularly on an enterprise-wide scale.

With respect to connectivity, test stations or automated test equipment devices (ATEs) have often been located on test floors that do not have network connections or that are configured in such a way as to make network connections to the ATEs rather difficult or impossible. In addition, many ATEs are designed to conduct specific tests that may be unrelated and unlinked to other device tests or manufacturing activities. Thus, test monitoring has previously focused on the individual test systems and has not adequately addressed enterprise level test monitoring and management. In addition, disparate tests and test stations typically do not have common data formats, but instead are often custom designed software packages that are interested in nothing but the operations of the particular test being run. Thus, if data is stored, it is often stored simply as a text file or in a proprietary format specific to the designer of the system. Although such raw test data has been stored centrally so that it can be retrieved at a later time for historical analysis, this raw test data is typically not formatted in any standard manner or managed such that it can be used as testing is in progress.

Tools have been previously developed to help connect test applications to other computers through a network, such as the LABVIEW enterprise connectivity toolset available from National Instruments. These tools allow connectivity to a database. However, these tools require the user to define the databases, communicate with them (usually through SQL commands) and program all the details about communication, database design and anything related to the database operations. As such, these tools do not provide an efficient and easily managed solution for configuring and managing enterprise test operations.

This need for systems to provide efficient test configuration and data management for test operations is distinct from a need for systems to monitor and manage manufacturing operations. Manufacturing execution systems (MES) have been developed that focus on controlling the execution of a manufacturing process including actions such as keeping track of materials, products, work in progress, etc. However, these MES systems are not directed to test operations. Example MES products are those that are sold under the trade names QFS available from Automation Programming, Inc. (API) and Xfactory available from USDATA. Such systems allow for the management of information about the manufacturing of the products. They are directed to a manufacturing point of view and are not directed to a testing point of view. Thus, such systems fall short on managing the test data and test results thereby making difficult the task of finding specific data about a test, and do not provide mechanisms to maintain configuration information about each test station or any tests run on each test station. In addition, such existing systems do not provide capabilities to monitor the test stations (or ATEs) and the data related to the ATEs. Without a direct connection between the ATEs and a server system, it is extremely difficult and complex to attempt to create software code that allows such capabilities.

SUMMARY OF THE INVENTION

The present invention provides test data model and test data structure creation improvements for enterprise test data management systems in the test, measurement and automation environment.

In one embodiment, the present invention is an enterprise test data management system having a hierarchical test data model including a plurality of test systems configured to operate test software to conduct at least one test on a device and to operate a data management software component where at least two of the test systems are directed to different test operations, and including one or more server systems coupled to the database and configured to communicate with the plurality of test systems to receive the test data through operation of the data management software components on the plurality of test systems and to manage and store data according to a test data model, such that the test data model includes hierarchical data objects configured to store test data related information. In further embodiments, one or more data objects within the test data model are linked such that data entered into one object can be used by other data objects and/or automatically propagated to linked objects, and default data object properties are defined such that each new data object includes the default properties. Still further, a graphical user interface (GUI) can be provided through which information can be input to the database where the GUI includes a first frame showing a structure for the hierarchical test data model and a second frame automatically showing one or more data input fields related to an object selected within the first frame. As described below, other features and variations can be implemented, if desired, and related methods can be utilized, as well.

In another embodiment, the present invention is a method for managing enterprise test data using a hierarchical test data model including operating a data management software component on a plurality of enterprise test systems where each test system is configured to operate test software to conduct at least one test on a device and to produce test data and where at least two of the test systems being directed to different test operations, utilizing one or more server systems to communicate with the plurality of test systems to receive the test data from the test systems through operation of the data management software components on the plurality of test systems, storing the test data from the test systems in a database utilizing a test data model that includes hierarchical data objects configured to store test data related information. In further embodiments, the method includes linking one or more data objects within the test data model such that data entered into one object can be used by other data objects and/or automatically propagated to linked objects, and defining default data object properties and including the default properties in each new data object. Still further, the method can include displaying a graphical user interface (GUI) through which information can be input to the database where the GUI includes a first frame showing a structure for the hierarchical test data model and a second frame automatically showing one or more data input fields related to an object selected within the first frame. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIGS. 11A, 11B, 11C, 11D and 11E provide process flow diagrams for automatic test structure creation according to an aspect of the present invention.

DETAILED DESCRIPTION OF THE INVENTION

The present invention relates to efficient test configuration and data management among disparate test operations, particularly on an enterprise-wide scale. An example for an enterprise test configuration and data management (ETCM) system is described in co-pending and co-owned application Ser. No. 10/225,825 which is entitled "TEST CONFIGURATION AND DATA MANAGEMENT SYSTEM AND ASSOCIATED METHOD FOR ENTERPRISE TEST OPERATIONS," the entire text and contents for which is hereby incorporated by reference in its entirety ("the '825 application"). The ETCM system described therein allows an entity to manage its test operations and related test stations (or ATEs) on an enterprise level through an interface that can access a centralized database of test related information, including test input parameters, test input data, test result data, test system information, test configuration information, data management information or any other desired test operations related information. Through this interface, which may be Internet-based access through a web browser and a graphical user interface (GUI), a user can log into the enterprise test configuration and data management (ETCM) system to configure, manage and monitor enterprise-wide test operations. Test data from disparate test operations and test stations can be stored in the remotely accessible database, and the data formats can be standardized or controlled to provide efficient and enhanced data storage and to allow efficient access, configuration and management through the centralized database.

With respect FIGS. 1A-B, 2A-C, 3A-C, 4A-D, 5 and 6A-B, the ETCM system of '825 Application is described. With respect to FIGS. 7A-C, 8, 9, 10, 11A-E and 12, additional advantageous features for such an ETCM system are described. Example embodiments are described below in more detail with respect to the drawings.

Figure 1A:
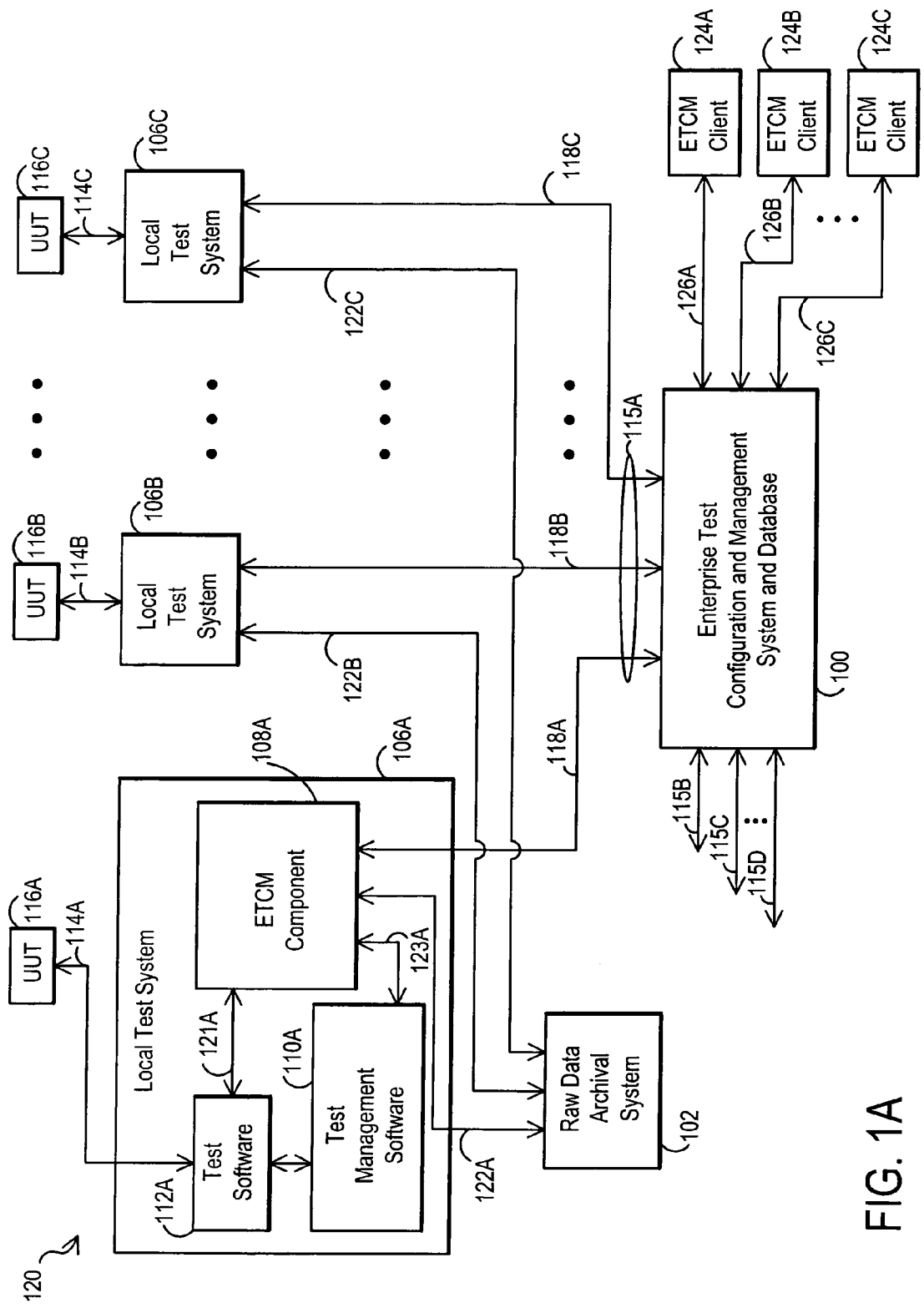
FIG. 1A is a block diagram for an enterprise test configuration and management (ETCM) system and database including an ETCM component residing on local test systems, according to the present invention.

FIG. 1A is a block diagram for a test environment 120 including an enterprise test configuration and management (ETCM) system and database 100, according to the present invention. The local test systems 106A, 106B . . . 106C include ETCM component 108A within the local test system 106A. As depicted, the ETCM component 108A operates on the local test system and can be operationally connected to the test software 112A and the test management software 110A through interactions 121A and 123A, respectively. It is noted that the ETCM component 108A can be a software module that communicates with the test software 112A and the test management software 110A through appropriate application programming interfaces (APIs). The ETCM component 108A can also be a software subroutine operating as part of the test software 112A and/or the test management software 110A. The test software 112A operates to control the testing of the UUT 116A, while the test management software 110A operates to control test execution, for example, controlling which tests are actually run from a number of tests potentially executable by the test software 112A. It is further noted that traditional implementations for the test management software 110A, such as TESTSTAND software available from National Instruments have not attempted to manage test data, but rather have been directed to the management of the test programs.

The ETCM component operates to provide test configuration and data management functionality for the test system and communicates with ETCM system and database 100 through connection 118A. The ETCM component 108A can also communicate with a raw data archival system 102 through connection 122A, if desired. Similarly, the ETCM components in the other test systems 106B . . . 106C also communicate with the ETCM system and database 100 through connections 118B . . . 118C, respectively, and also communicate with the raw data archival system 102 through connections 122B . . . 122C, respectively. To provide remote configuration, management and monitoring of test operations, the ETCM system and database 100 also communicates with ETCM clients 124A, 124B . . . 124C through connections 126A, 126B . . . 126C, respectively. It is noted that the connections 118A, 118B . . . 118C and 126A, 126B . . . 126C can be, for example, any desired communication media, including but not limited to intranet networks, wireless networks, the Internet, or any other device or system that allows systems to communicate with each other. The test systems 106A, 106B . . . 106C can be any desired test device or system utilized in a test, measurement and automation environment.

The ETCM system and database 100 can communicate with a number of different test sites and a number of different test lines at a given test site. Considering local test systems 106A, 106B . . . 106C as a number of different test systems located at a particular test site, the collective communication connections 118A, 118B . . . 118C from this site can be designated as connection 115A. Considering that an enterprise can include a number of different test sites, the connections 115B, 115C . . . 115D represent these additional test sites. Thus, the ETCM system and database 100 can be in communication with a large variety of different test sites and lines and the organization of this information and test operation structure can be configured by the user, if desired.

The collective ETCM components 106 and the ETCM system and database 100 together allow for a wide range of test configuration and data management functionality to be provided to ETCM clients 124. In short, the present invention links together, formats and standardizes the flow of control and test data among disparate test sites and associated test lines and test systems using a centralized ETCM system and database 100 and an ETCM component 108 operating with respect to the individual test stations. The present invention thereby provides for a wide variety of useful functions, including management, monitoring, alarm notification and reporting of enterprise test activity.

Figure 1B:
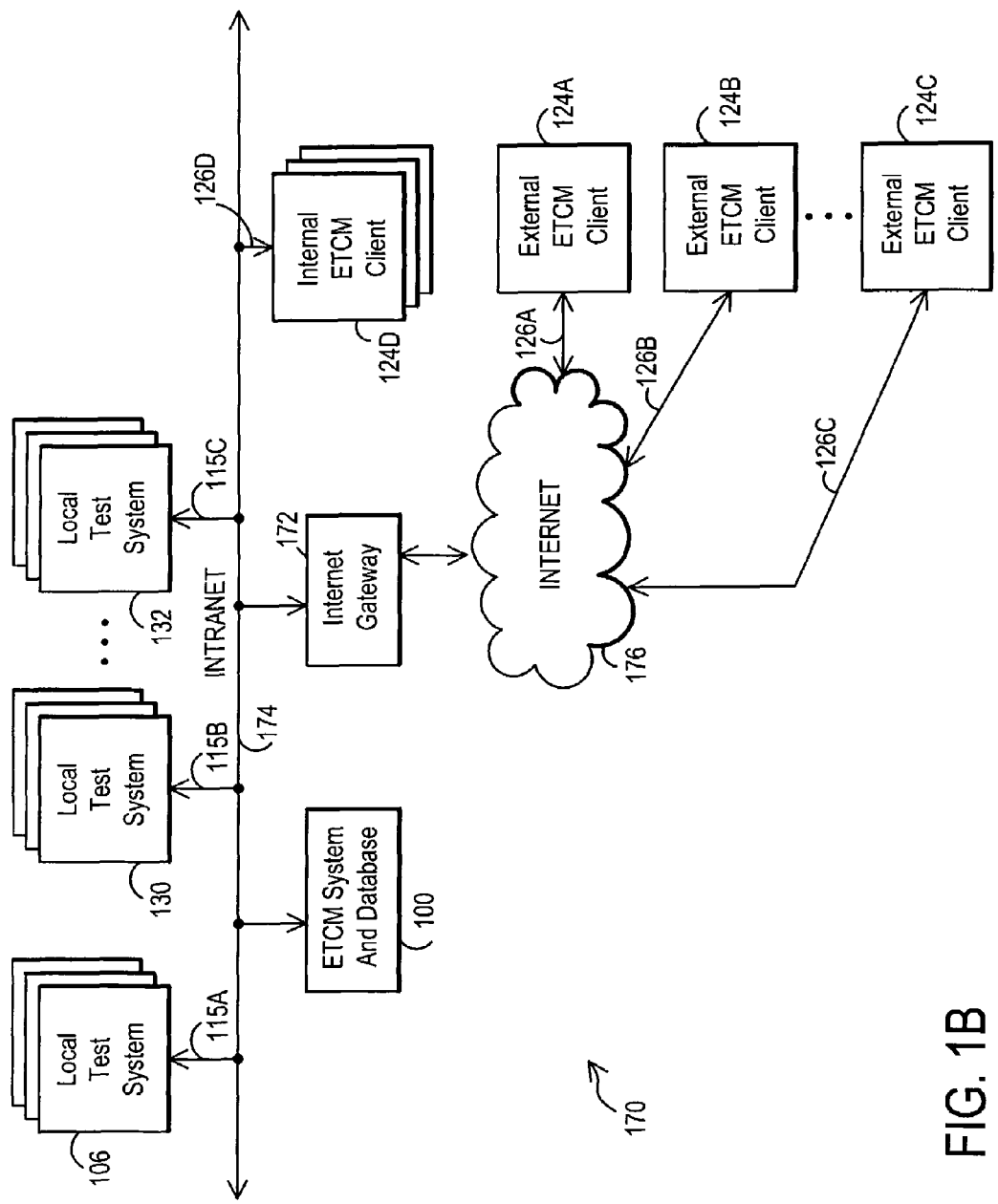
FIG. 1B is a block diagram for an enterprise environment including an ETCM system and database, according to the present invention.

FIG. 1B is a block diagram for an enterprise environment 170 that includes an ETCM system and database 100, according to the present invention. As depicted in this embodiment, the enterprise environment 170 includes a corporate intranet 174 to which are connected an Internet gateway 172 and the ETCM system and database 100. The enterprise environment 170 also includes a number of test sites represented by local test systems 106, 130 . . . 132 that are in communication with the intranet 174 through respective connections 115A, 115B . . . 115C. External ETCM clients 124A, 124B . . . 124C can communicate through the Internet 176 and the Internet gateway 172 to the intranet 174. In addition, internal ETCM clients 124D can communicate through the intranet 174 to the test systems and the ETCM system and database 100. Thus, the groups of test systems 106, 130 . . . 132, the ETCM system and database 100 and the ETCM clients 124A, 124B, 124C . . . 124D are all connected through a communication media. It is further noted that this example environment and communication infrastructure can be modified as desired. For example, the test systems could communicate with the ETCM system and database 100 through the Internet rather than through a corporate intranet. In addition, any of a variety of communication techniques may be used, including wireless connectivity.

As further described below, the ETCM system and database 100 allows users to manage test stations, test data, results and any other desired information for a group of test stations connected together through any of a variety of different media. The test stations do not need to be limited to certain type of testable devices (UUT) nor to how many devices can be tested in any period of time. The ETCM system enables users and other software programs to manage test stations from any remote location through a centralized data system. The ETCM system also allows the test station terminals to register and communicate with a centralized repository, thereby facilitating the transfer of test related information such as test data results, configuration, serial numbers, etc. The ETCM system and its components further provides programming interfaces to allow other devices and systems to connect and communicate with the ETCM system and its components. The ETCM system also provides graphical user interfaces (GUI) for operation and manipulation of the test information, test configuration and data management details, as well as any other desired test operation parameter.

It is further noted that the number of test stations can be divided and organized in different categories, which are fully configurable to the user's needs, and that the ETCM system can allow for the remote management of these test stations. In addition, these test stations can be distributed on a network inside a single building or can be distributed in any number of different locations around the world. The ETCM system of the present invention is not a factory execution system. Rather, it is a system that enables the management of test stations and related information as well as the management of test data. The stations can be distributed anywhere in the world and can be accessed through a computer terminal from anywhere where access to the central repository or database systems is available.

Management of test stations and test related information can include a variety of different capabilities to provide users and organizations with desirable and advantageous functionality. For example, test stations (or ATEs) may be organized in a logical way according to a customer's specific needs, independent of the physical location of the test stations. In addition, test station information, such as serial number, vendor, network settings, building location, department responsibility, etc., can be saved, retrieved and administered, either remotely or locally, as desired. Information can be set up to track test stations programmatically or through a graphical user interface. Changes to test station information can be scheduled so that these changes are made at a latter specific time and date. Changes can also be made to a single test station or to groups of test stations, depending upon customer needs or the manner in which the user chooses to configure test operations. Software versions and updates can also be monitored, controlled and remotely downloaded to test stations depending upon configurations or user input. Specific test configuration information can be retrieved and administered through the ETCM system, as well. This configuration information can include, for example, test plan configuration information (test plan name, author, last modified, available test stations, etc.), test step configuration information (name, properties, execution properties, etc.) and execution specific configuration information (start time, end time, calibration at execution, etc.). Test operations may also be configured to allow tracking of test related activities such as the test plan, test steps, and test execution, either programmatically or through a graphical user interface. Further, the test results can be collected, organized and analyzed. For example, what test data to collect can be configured based upon a selection of the test procedures and results to include. In addition, events can be configured, enabled and disabled so that if a particular event occurs, the system will execute a specific action, such as a notification to a responsible engineer when a test parameter meets some defined condition, such as the test parameter being equal to a selected value, the parameter being over or under a certain range, etc.

Figure 2A:
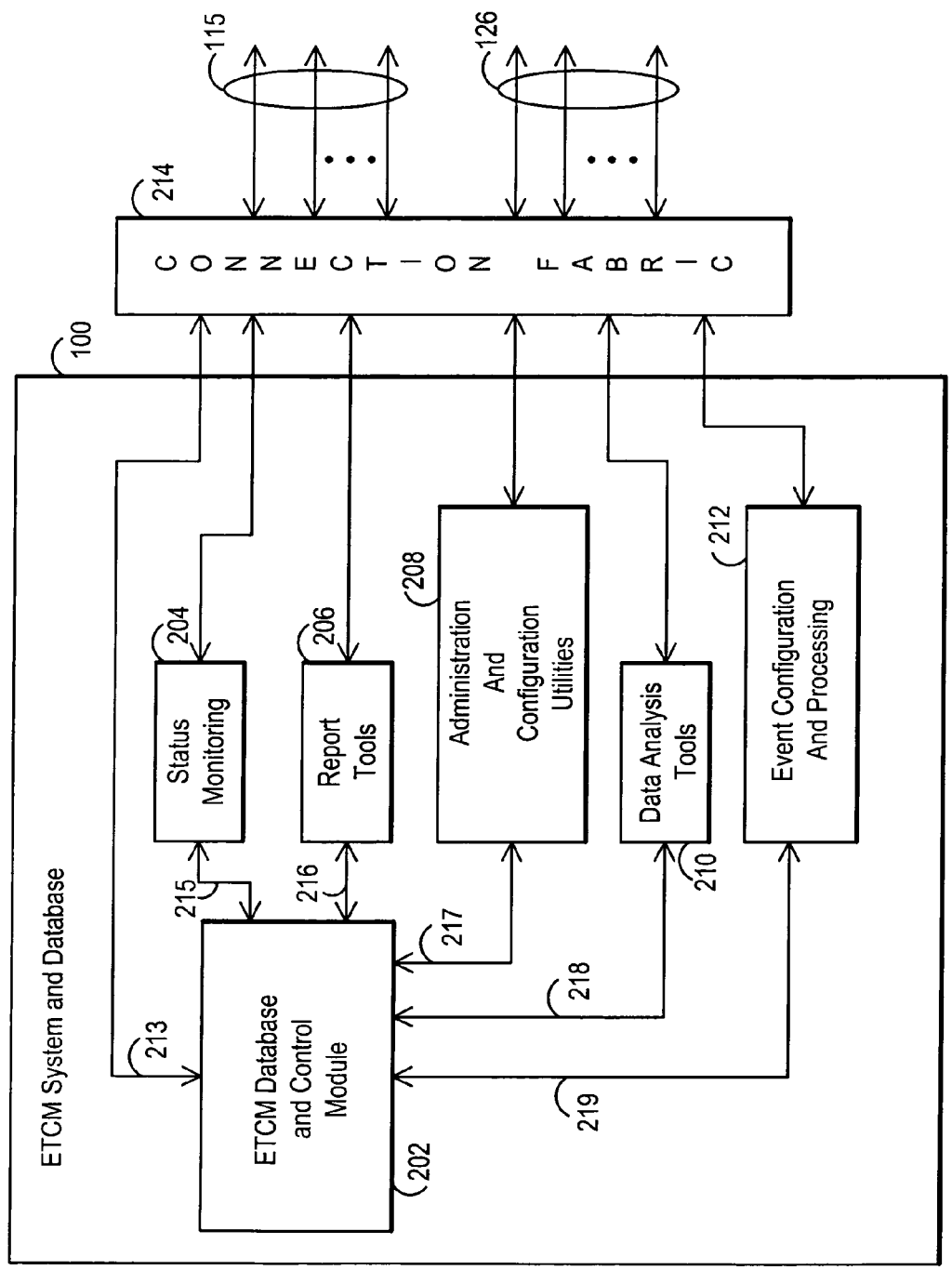
FIG. 2A is a block diagram for an ETCM system and database including various tools, modules and utilities connected through any desired connection media to test stations and ETCM clients, according to the present invention.

Looking now to FIG. 2A, a block diagram is depicted for the ETCM system and database 100, which includes various tools, modules and utilities connected through any desired connection media to test stations and ETCM clients, according to the present invention. In the embodiment depicted, the ETCM system and database 100 includes a status monitoring module 204, report tools 206, administration and configuration utilities 208, data analysis tools 210 and an event configuration and processing module 212. Each of these modules, tools and utilities 204, 206, 208, 210 and 212 are connected to the ETCM database and control module 202 through connections 215, 216, 217, 218 and 219, respectively. Each of these modules, tools and utilities 204, 206, 208, 210 and 212 are connected to connection fabric 214, and the ETCM database and control module 202 is connected to connection fabric 214 through connection 213. The collective connections 115 for the tests systems and the collective connections 126 for the ETCM clients are also connected to the connection fabric 214. The connection fabric 214 represents any of a variety of mechanisms and architectures for effecting the communication of information between different electronic devices.

The status monitoring module 204 operates on ETCM server systems that are part of the ETCM system and database 100 and can provide a variety of monitoring features that are accessible to the ETCM clients, including enabling a user to remotely monitor ATEs connected to the ETCM system, for example, by providing a remotely accessible hierarchical view of all the ATEs connected into the ETCM system and by providing the user access to more details about particular test stations or ATEs.

The report tools 206 operate on ETCM server systems that are part of the ETCM system and database 100 and provide a variety of reporting features that are accessible to the ETCM clients. For example, the report tools 206 can provide pre-configured reports to display to the user. It can also provide mechanisms for users to configure and create their own reports. These pre-configured and user configured reports can be generated from the information contained on the database server about the ETCM system in general or, more particularly, from information on the database server about specific test stations, devices, UUTs, etc. These reports can be generated and viewed as desired by the user.

The administration and configuration utilities 208 operate on ETCM server systems that are part of the ETCM system and database 100 and provide a variety of test and data administration and configuration features that are accessible to the ETCM clients. For example, the user can remotely create and modify configuration models and information about the ATEs. These accesses can also be done for individual ATEs or for groups of ATEs, as desired.

The data analysis tools 210 operate on ETCM server systems that are part of the ETCM system and database 100 and provide a variety of data analysis tools that are accessible to the ETCM clients. For example, data analysis tools can provide mechanisms to analyze the data gathered on the test stations. One such mechanism is to allow a user to view the trend in a particular value of all the units tested on selected test stations.

The event configuration and processing module 212 operates on ETCM server systems that are part of the ETCM system and database 100 and provides a variety of testing event notification features that are accessible to the ETCM clients. For example, this module 212 can allow the user to configure an event that gets triggered when a configured condition is met. For example, a user might want to be notified by email when more than a specified number of units (such as five units) have failed on a test station during a period of time. In this case, the user can configure the event through access to this module and the system will provide the corresponding notification.

Figure 2B:
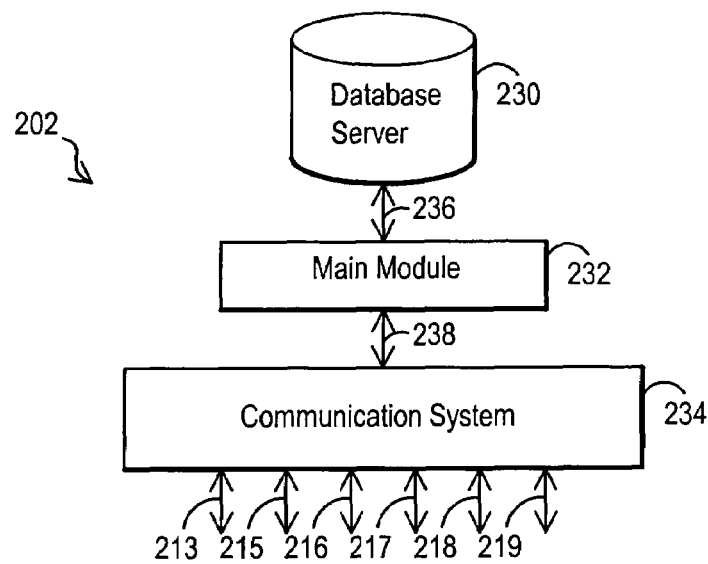
FIG. 2B is a block diagram for an ETCM database and control module including a main module and communication system that allow for transparent database access, according to the present invention.

FIG. 2B is a block diagram for an ETCM database and control module 202, which includes a main module 232, communication system 234 and database server 230, which communicate with each other through connections 236 and 238. In the embodiment shown, connections 213, 215, 216, 217, 218 and 219 correspond to the connections depicted in FIG. 2A.

The database server 230 provides the core database functions and can be, for example, a ORACLE database system available from Oracle, a DB2 database system available from IBM or an SQL SERVER database system available from Microsoft. For example, the database server 230 can be a centralized repository of information for the ETCM system. Stored information held by the database server 230 can include any desired information, such as information about each test station, about each test related to each test station, about the devices or units under test. As indicated above, reports generated through the ETCM system can be created as a result of querying the database server 230 for desired information. In short, the database server 230 stores the data utilized for the operation of the ETCM system and enables the efficient retrieval of this data when desired.

The main module provides an interface to the database server and thereby allows for relatively transparent database access by devices desiring to store or retrieve information from the database server 230. For example, the main module 232 can provide mechanisms to access the information contained in the database server and can allow a developer of the ATE to utilize the database without the overhead of learning and using SQL and database access techniques. The communication system 234 provides a connection for systems and modules communicating with the main module and may include various security measures, as desired.

Figure 2C:
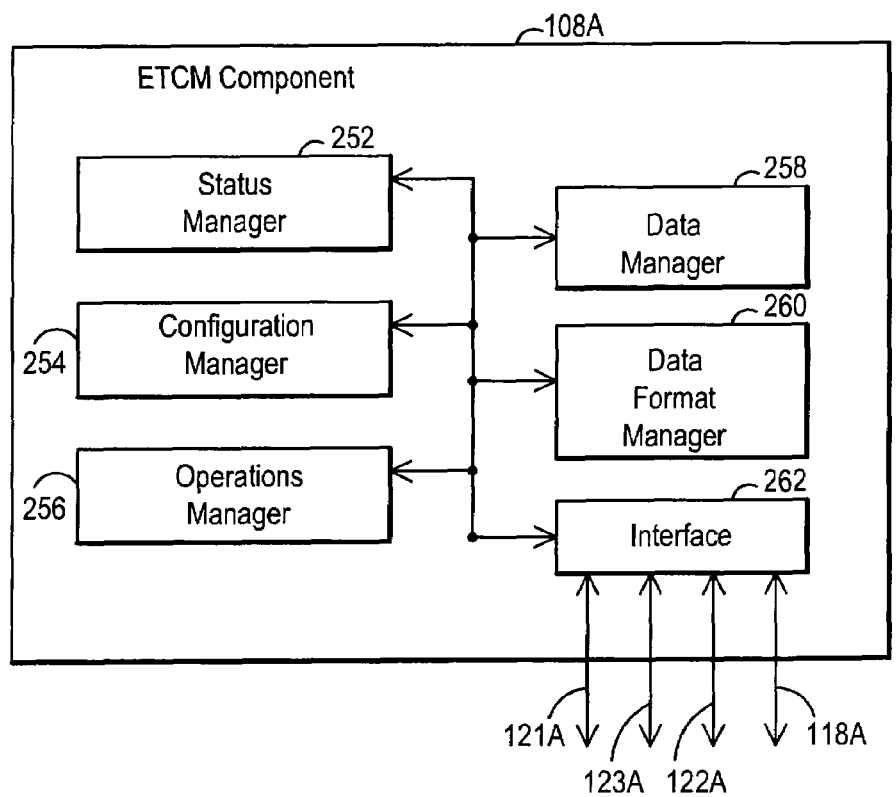
FIG. 2C is a block diagram for an ETCM component running on a local test station, according to the present invention.

FIG. 2C is a block diagram for an ETCM component 108A operating on a local test station 106A. The ETCM component 108A includes a status manager 252, a configuration manager 254, an operations manager 256, a data manager 258, a data format manager 260 and an interface 262. The interface 262 provides a communication link to other software or device operations, for example, through connections 121A, 123A, 122A and 118A, as discussed above. The status manager 252 operates to control, manage and track test status and ETCM status information (such as pass or fail, running, connected, scheduled, etc.). The configuration manager operates to control, manage and track test configuration information (such as test name, author, test steps, measurements, test sequences, etc) that can be communicated to and from the test software 112A and the test management software 110A. The operations manager provides general control and management functions for the operation of the ETCM component 108A. The data manager 258 provides control and management of test related data, such as input data and test result data. Examples of this data management are further discussed with respect to FIGS. 3A-3C below. The data format manager 260 operates to effect any data format changes or modifications that facilitate data communications between various software and hardware components that are connected to the ETCM component 108A. For example, data from the test software 112A may be in a pure, unstructured text string format. The data format manager 260 can modify this data so that it takes a format that can easily be incorporated into the database server 230 utilized by the ETCM system and database 100. In other words, if the database server 230 is an SQL Server database, the data being communicated to and from the test software 112A and/or the test management software 110A can be converted to and from an SQL Server format to the particular data format expected and/or utilized by these other software components. It is also noted that data format modifications and conversions can be accomplished, in whole or in part, as part of the operations of the ETCM system and database 100, if desired, such that data from the test software 112A can be in a format different for the format desired for use with the database server 230.

Figure 3A:
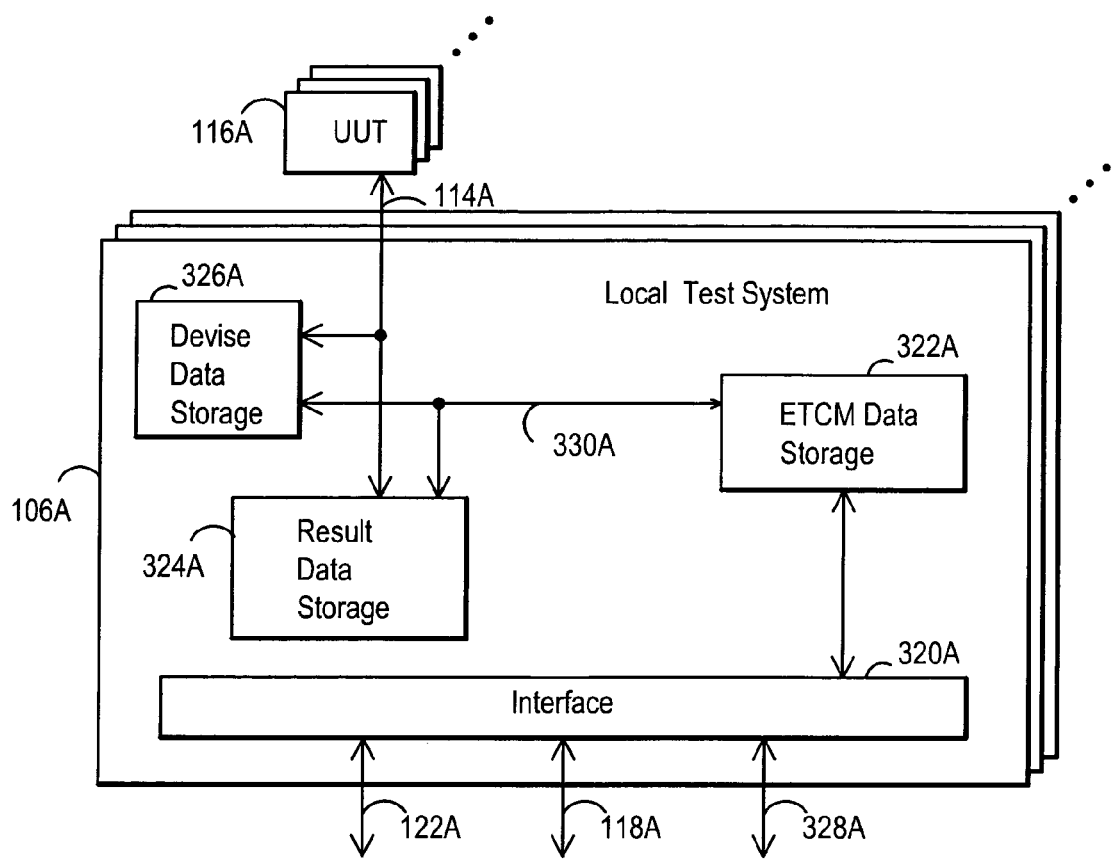
FIG. 3A is a block diagram of data flow for a local test system that includes an ETCM module according to the present invention.

FIG. 3A is a block diagram of example data flow for local test systems that include ETCM components according to the present invention. As depicted, a number of local test systems and associated UUTs can be part of the enterprise test and management system. A representative data flow is shown for local test system 106A. Interface 320A provides a communication interface for the transfer of information and data between the local test system 106A and external devices and systems. For example, connection 122A corresponds to the connection in FIG. 1A to the raw data archival system 102, and connection 118A corresponds to the connection in FIG. 1A to the ETCM system and database 100. In addition, connection 328A represents other control and/or data information that may be communicated to and from the local test station 106A. As discussed above, the ETCM module 108A within the local test system 106A controls the flow of data. The device data storage 326A and the result data storage 324A are connected to the UUT 116A and to the ETCM data storage 322A. The device data storage 326A represents local storage of test related data and data relating to the device being tested or the UUT. The result data storage 324A represents local storage of data relating to test results. The ETCM data storage 322A represents storage of data relating to ETCM activities. It is noted that data can be stored in any desired manner, according to the present invention, as long as an ETCM module is present to control, at least in part, the flow of data.

Figure 3B:
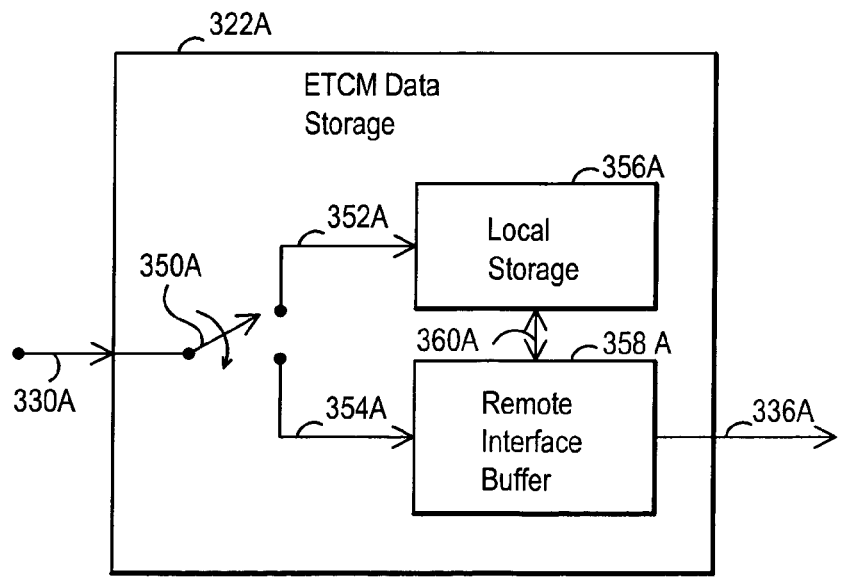
FIG. 3B is a block diagram of a selectable local/remote data path for ETCM data storage, according to the present invention.

FIG. 3B is a block diagram of a selectable local/remote data path for ETCM data storage 322A. As discussed above, the ETCM module of the present invention provides active configuration and management of enterprise-wide test operations. As part of this operation, the ETCM data storage 322A allows for data to be sent remotely from the local test system in a variety of ways. For example, if an external connection to a remote device is operable, the data on line 330A coming into the ETCM data storage 322A can be immediately transmitted along line 354A to a remote interface buffer 358A and out line 336A to the remote device. Also, if an external connection is not active, the data on line 330A coming into the ETCM data storage 322A can be transmitted along line 352A to be stored in local ETCM storage 356A for later transmission, when an external connection is active, along line 360A to the remote interface buffer 358A and out line 336A to the remote device. The switch or selection block 350A provides the ability to select between these paths depending upon the availability of an external connection.

Figure 3C:
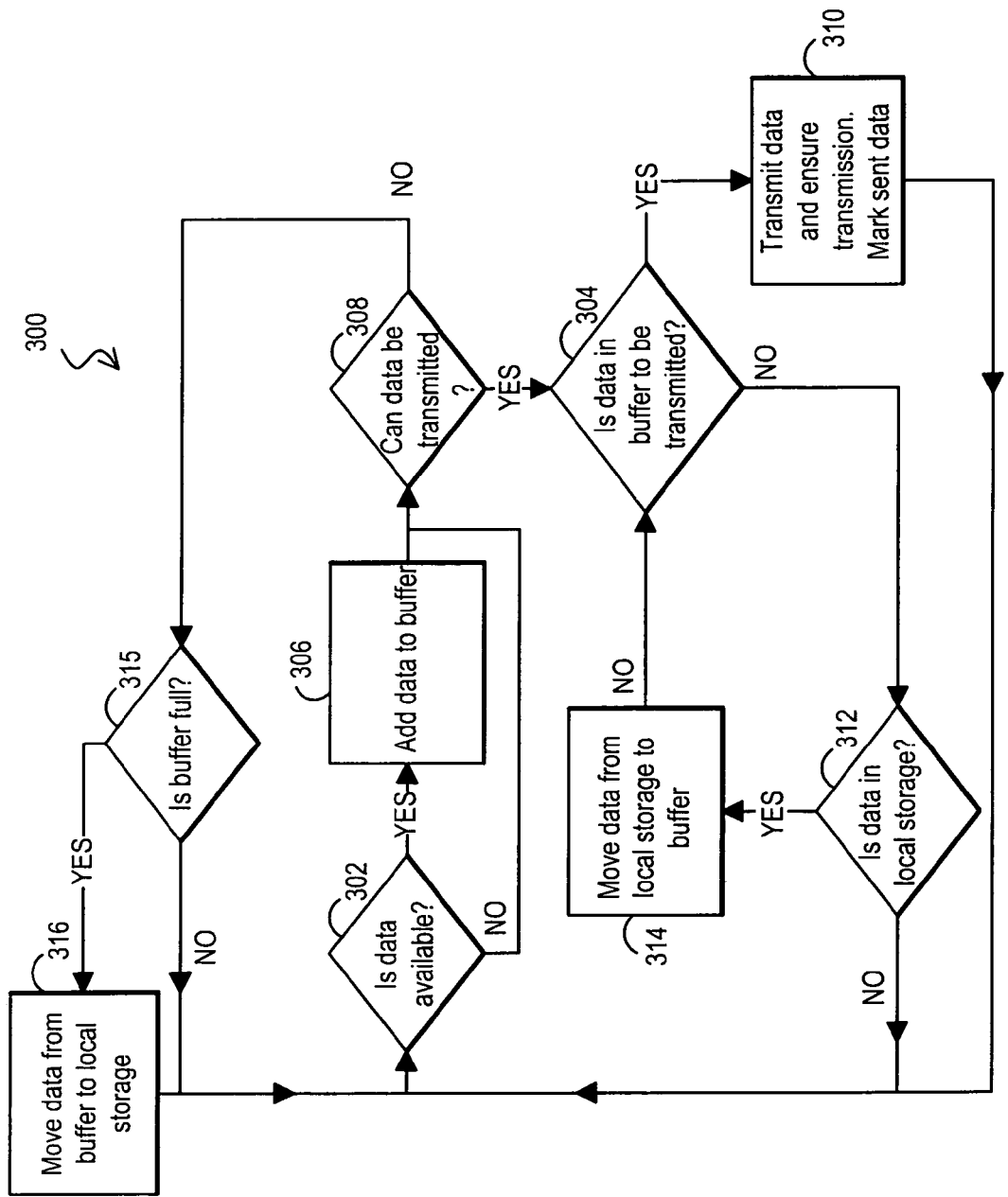
FIG. 3C is a flow diagram for data flow associated with the selectable local/remote data path for ETCM data storage, according to the present invention.

FIG. 3C is a flow diagram for data flow 300 associated with the selectable local/remote data path for ETCM data storage, according to the present invention. Starting first with decision block 302, the ETCM module data flow transmission process determines if result test data is available. If "yes," the data is added to the transmission interface buffer 358A in block 306. In decision block 308, the ETCM module data flow transmission process determines if a connection is active so that data can be transmitted. If "yes," then control passes to block 304 where a determination is made whether there is data in the buffer to be transmitted. If "yes," then the data is transmitted in block 310. In addition, the sent data can be marked as sent, and the process can ensure data transmission, for example, through a data valid and received acknowledgement from the receiving device. Flow then proceeds back to block 302. If the determination in decision block 308 is "no," decision block 315 is reached in which a determination is made whether the interface buffer 358A is full. If the answer is "no," flow proceeds back to block 302. If the answer is "yes," then the data is moved to the local ETCM data storage 322A in block 316.

Looking back to decision block 302, if the answer is "no" and data is not currently available for transmission, the ETCM module data flow transmission process proceeds to decision block 308 to determine if data can be transmitted. If the answer is "no," control proceeds on to decision block 315. If "yes," flow proceeds on to block 304 to determine whether there is data in the remote interface buffer 358A that is ready for transmission. If "yes," flow proceeds to block 310. If "no," flow proceeds to decision block 312 where the ETCM module data flow transmission process determines whether there is data stored in the local ETCM data storage 322A. If "yes," data is moved from the local ETCM data storage 322A to the remote transmission interface buffer 358A in block 314, and flow proceeds back to decision block 304. If "no," flow proceeds back to decision block 302.

Figure 4A:
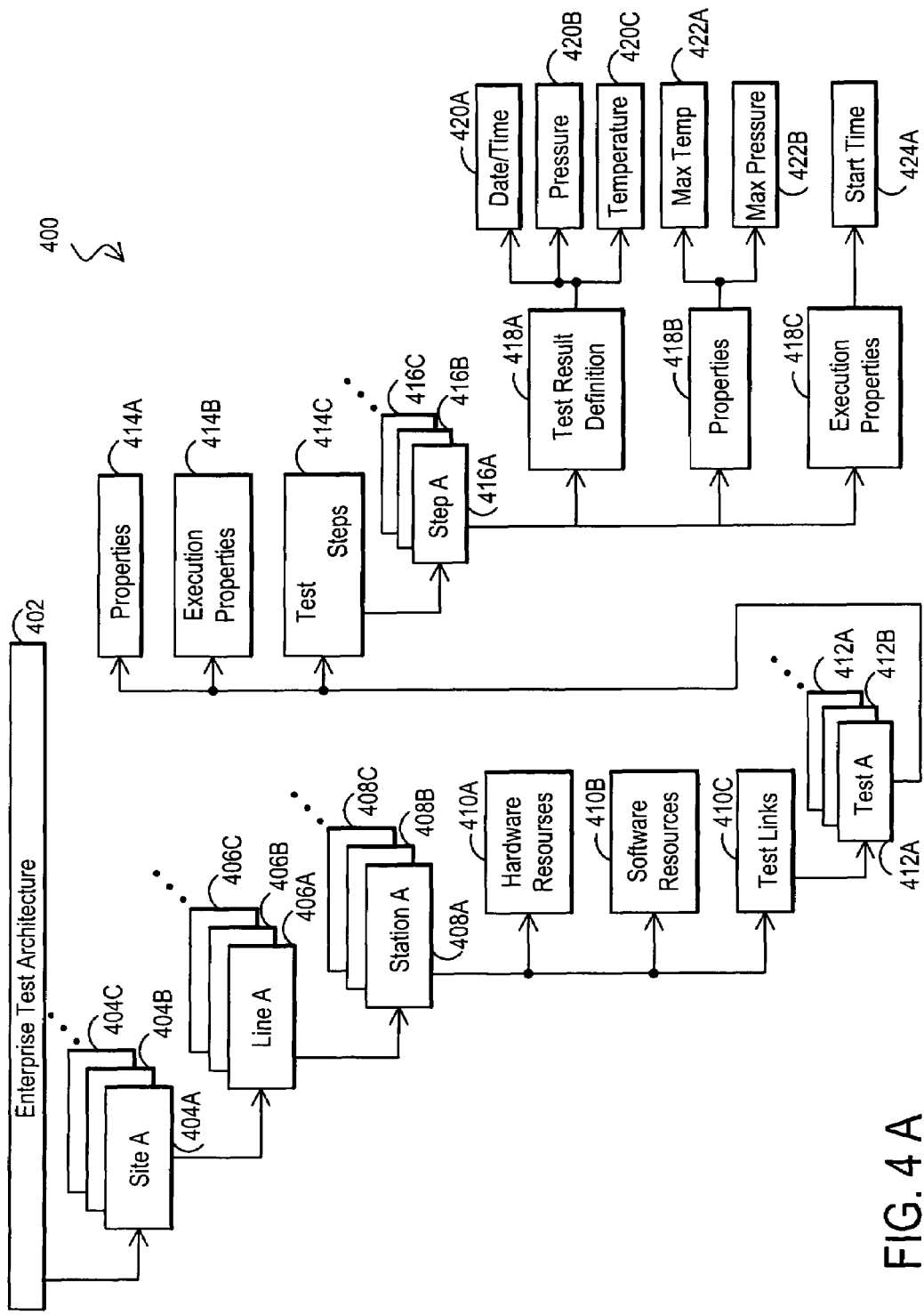
FIG. 4A is a block diagram for an ETCM control architecture that allows monitoring and management of a plurality of test sites that each having a plurality of test lines or floors that each in turn have a plurality of test systems and associated hardware, software and test parameters.

FIG. 4A is a block diagram for an example ETCM control architecture that allows monitoring, configuration and management of a plurality of test sites that each having a plurality of test lines or floors that each in turn have a plurality of test systems and associated hardware, software and test parameters. This ETCM architecture 400, for example, may be provided through a graphical user interface (GUI) that allows manipulation of enterprise-wide test configuration and data management. Block 402 represents the overall enterprise test architecture under which a tree-like control structure is organized. This tree-like structure can be created, modified and configured by a user logged into the ETCM system and database. In the example depicted, items 404A (SITE A), 404B, 404C, . . . represent different test sites which may be, for example, at different geographic locations. Items 406A (LINE A), 406B, 406C, . . . represent different test lines or floors that may exist at any given test site, such as test site 404A (SITE A). Similarly, items 408A (STATION A), 408B, 408C, . . . represent different test stations or ATEs that may exist for any given test line, such as test line 406A (LINE A).

For each such test station 408A (STATION A), additional information may be provided, such as hardware resources 410A, software resources 410B and test links 410C to tests 412A (TEST A), 412B, 412C . . . , which may in turn represent, for example, tests that can be run or are running on the test stations, such as test station 408A (STATION A). For each test, such as test 412A (TEST A), additional test related information can be provided. This information can include items such as general test properties 414A, test execution properties 414B, and test steps 414C that links to individual test steps 416A (STEP A), 416B, 416C, . . . for the test. Each test step, such as test step 416A (STEP A) can have still additional information linked to it such as test result definition 418A with parameters such as date/time 420A, pressure 420B and temperature 420C; properties 418B with parameters such as maximum temperature 422A and maximum pressure 422B; and execution properties 418C such as start time 424A. In addition to the example control, configuration and management information provided in FIG. 4A, other information and related links can be provided, as desired, through the enterprise test architecture 402.

This control architecture 400 and associated interface allows users, if desired, to monitor, configure and manage enterprise test facilities from a single point as those operations are occurring. Information may be viewed and modified to generate any desired view of the test facilities and operations for the company. In addition, tests on particular test stations can be monitored, manipulated, configured, etc. as desired through the user interface. For each of the items in FIG. 4, for example, the user can add, delete or modify the item, its location in the tree, and/or the parameters associated with the item. In addition, the user can organize the information as the user desires, similar to a file folder structure in as typical with file handling in personal computer operating systems, such as WINDOWS 95/98 available from MICROSOFT. Thus, the actual, current operations of the test stations can be managed, configured and controlled from a remote location through access to a centralized database.

Thus, from one interface, a user may determine the current status of enterprise-wide test operations and view these operations on increasing or decreasing levels of detail, as desired, through the tree-like interface structure. In addition, an indication at each level may be provided for status events, such as "green" for operations within desired parameters, "yellow" for operations within concern levels and "red" for operations that have either stopped or are threatening production or product yield. In this way, an engineer or test operations manager can quickly monitor, configure and manage test operations through a remotely accessible ETCM system and database. This feature provides a way to evaluate the current status of the test operations from one point, thereby providing the ability to make better decisions. In other words, the person reviewing or managing the test operations does not need to be at the same facility to view the ETCM information. In addition, because this access can be accomplished remotely, companies that have a distributed manufacturing environment, for example, different steps of the production line are located at different locations, can use this interface tool to enable personnel to access, monitor and evaluate production line operations as a whole from one point.

Figure 4B:
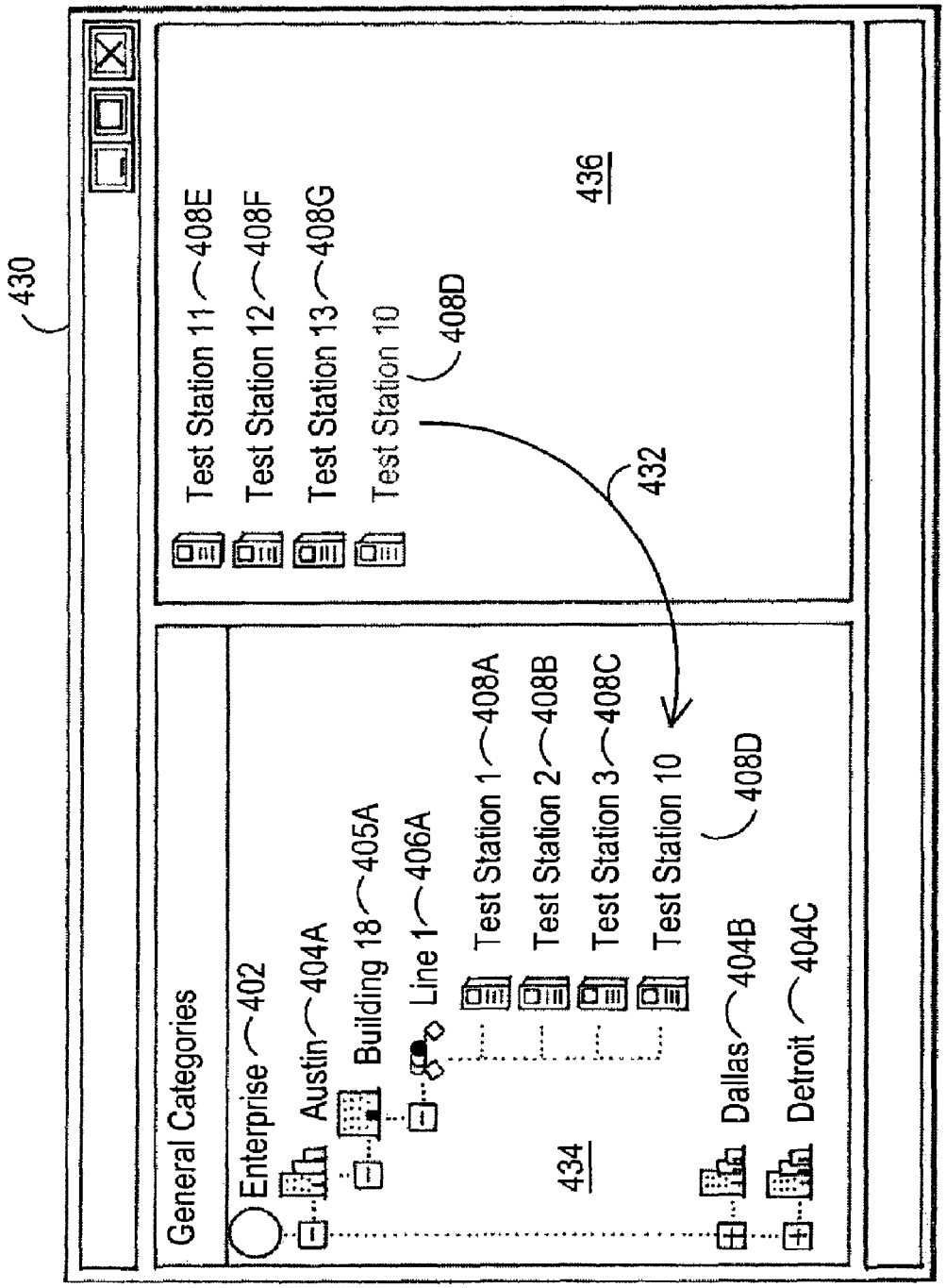
FIGS. 4B, 4C and 4D are example graphical user interfaces for portions of the tree-like test configuration and data management structure depicted for the enterprise test architecture in FIG. 4A, according to the present invention.
Figure 4C:
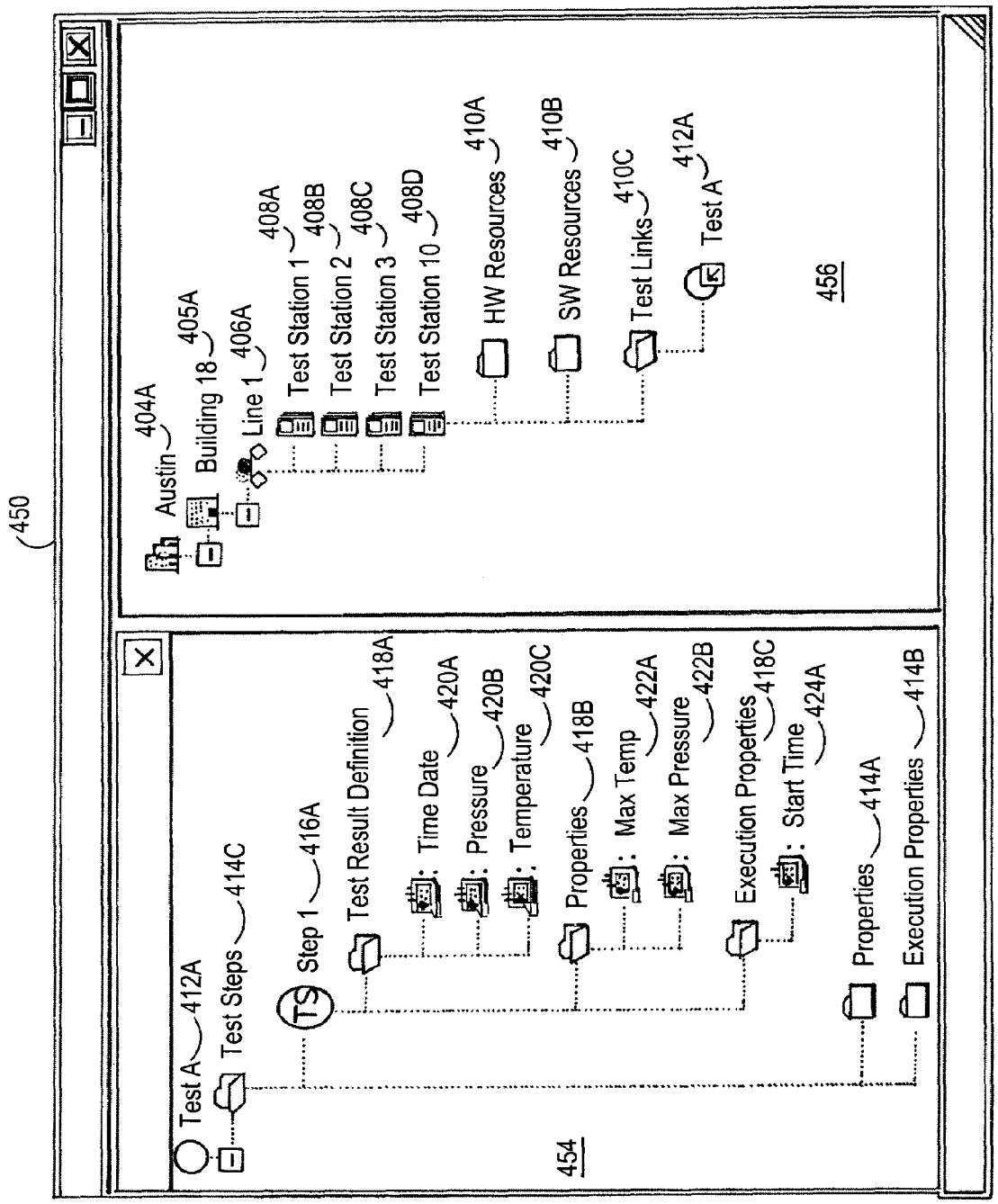
Figure 4D:
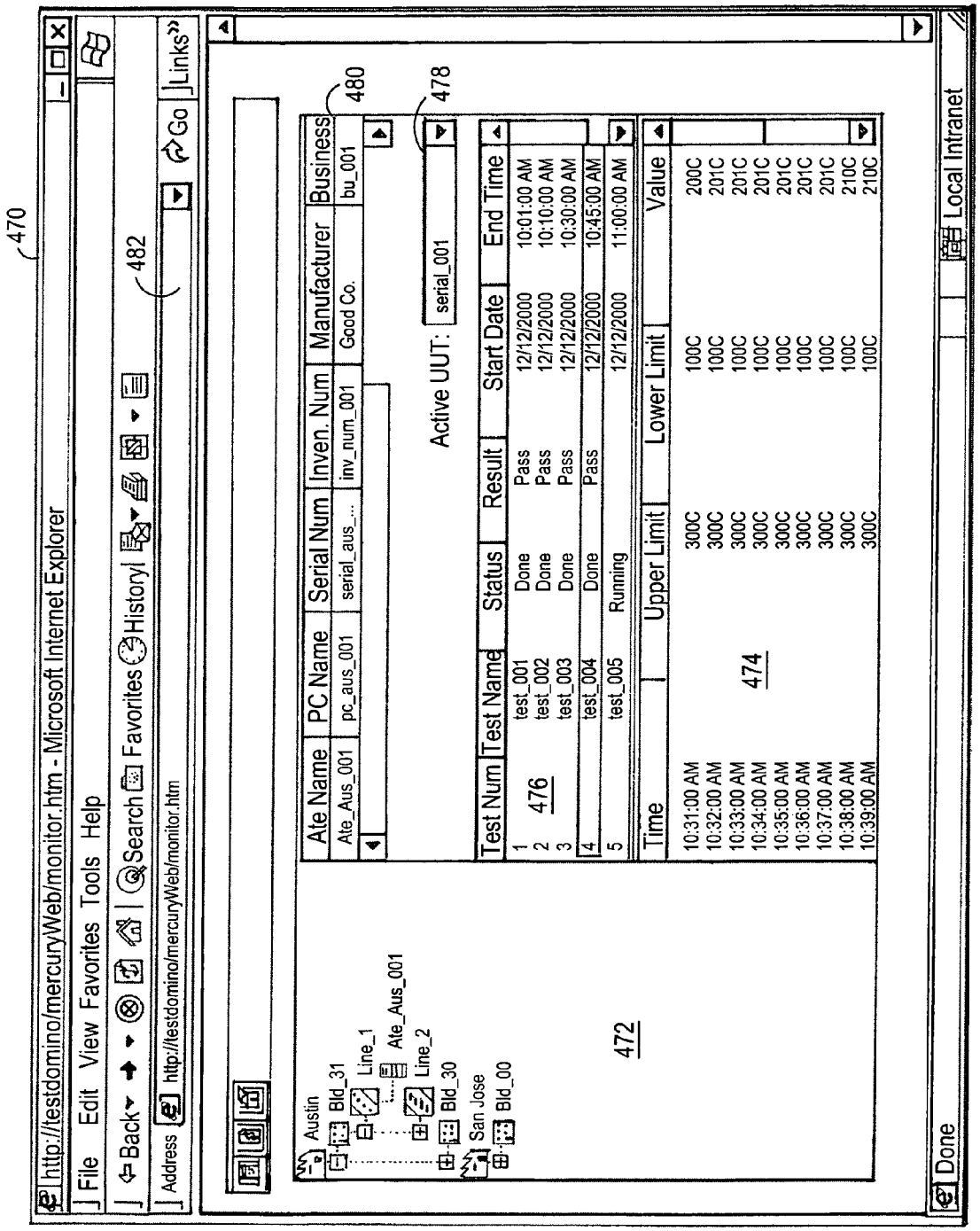

FIGS. 4B, 4C and 4D provide example graphical user interfaces (GUIs) for portions of the tree-like test configuration and data management structure depicted for the enterprise test architecture in FIG. 4A. Looking first to FIG. 4B, a "window" interface with a tree-like selection structure is depicted, for example, similar to those used by the MICROSOFT 95/98 operating system available from MICROSOFT. Within the window 430, there are a number of items related to enterprise test operations that correlate to those in FIG. 4A. As depicted, these items are separated into a "General Categories" portion 434 that includes an enterprise test operations architecture tree and portion 436 that includes a list of test stations that can be allocated or configured to be part of the architecture tree. More particularly, in portion 434, the enterprise 402 includes three test operation sites, namely the Austin site 404A, the Dallas site 404B and the Detroit site 404C. Again as depicted, the user has selected the Austin site 404A to reveal its sub-categories in the tree-like structure. Similarly, Building18 405A (part of an additional layer to those depicted in FIG. 4A) has been selected, as has Line 1406A. Within Line1 406A are TestStation1 408A, TestStation2 408B, TestStation3 408C and TestStation10 408 D. In portion 436, three test stations are listed TestStation1 1408E, TestStation12 408F and TestStation13 408G. The fourth listed test station TestStation10 408D is grayed. Line 432 indicates that the user has selected and moved this TestStation10 408D from the test station list in portion 436 to be included within the Line1 406A portion of the architecture tree. Using a computer GUI, this move operation, for example, may be effected by a click and drag operation with a mouse or through the use of other standard techniques as would be known in the art for GUIs.

FIG. 4C depicts a GUI that provides further levels of details concerning test operations and configuration. Within the window 450, there are a number of items related to enterprise test operations that correlate to those in FIG. 4A. These items are separated into portion 456 that includes an architecture tree of test operations in the Austin site 404A and portion 454 that includes an architecture tree related to TEST A 412A. Within portion 456, the same information related to the Austin site 404A has been selected for display as is shown in FIG. 4B with the addition of information related to TestStation10 408D. Sub-information under TestStation10 408D includes Hardware (HW) Resources 410A, Software (SW) Resources 410B and Test Links 410C, which has further been selected to reveal TEST A 412A. Looking to portion 454A, additional information is displayed concerning TEST A 412A including Properties 414A, Execution Properties 414B and Test Steps 414C, which has also been selected to show information related to TestStep1 416A. This information includes TestResultDefinition 418A (with sub-information TimeDate 420A, Pressure 420B and Temperature 420C), TestProperties 418B (with sub-information MaxTemp 422A and Max Pressure 422B) and TestExecutionProperties 418C (with sub-information StartTime 424A). As stated above, the GUI can allow creation operations, click and drag operations, selection operations and other operations consistent with window and tree architecture operations that are common to GUI based environments, such as used by the WINDOWS 95/98 operating system.

FIG. 4D depicts a GUI that provides test execution related information for enterprise test operations through a network browser. Window 470 provides an example of a standard GUI interface as may be displayed through INTERNET EXPLORER available from Microsoft. As with the other GUIs, a pointer device, such as a mouse and/or a keyboard, can be used to navigate the interface. The "address" space 482 provides a data input field to provide the web site or network address for test monitoring access. The space 472 provides a similar tree structure to that discussed with respect to FIGS. 4A and 4B above, with the test stations in FIGS. 4A and 4B corresponding to ATEs in FIG. 4D, such as ATE_AUS_001. The space 480 provides detailed information concerning the particular ATE, for example, ATE name, PC name, serial number, inventory number, manufacturer, business unit, etc. Thus, space 480 can be used to provide any desired information related to the ATE and relate devices, systems and software that are being utilized for device testing. The space 478 provides information concerning the device or unit-under-test (UUT) that is being monitored or accessed, such as SERIAL_001 as shown in FIG. 4D. The space 476 provides information concerning the tests that are being run on the UUT, for example, Test Number, Test Name, Status, Result, Start Date, End Time, etc. Thus, space 476 can be used to provide any desired information related to the test being utilized for device testing. The space 474 provides information concerning the particular test, for example, Time tag, Upper Limit allowed, Lower Limit allowed, actual test Value, etc. As with the other spaces, this space 474 can be used to provide access to any desired information relating to the selected item.

Figure 5:
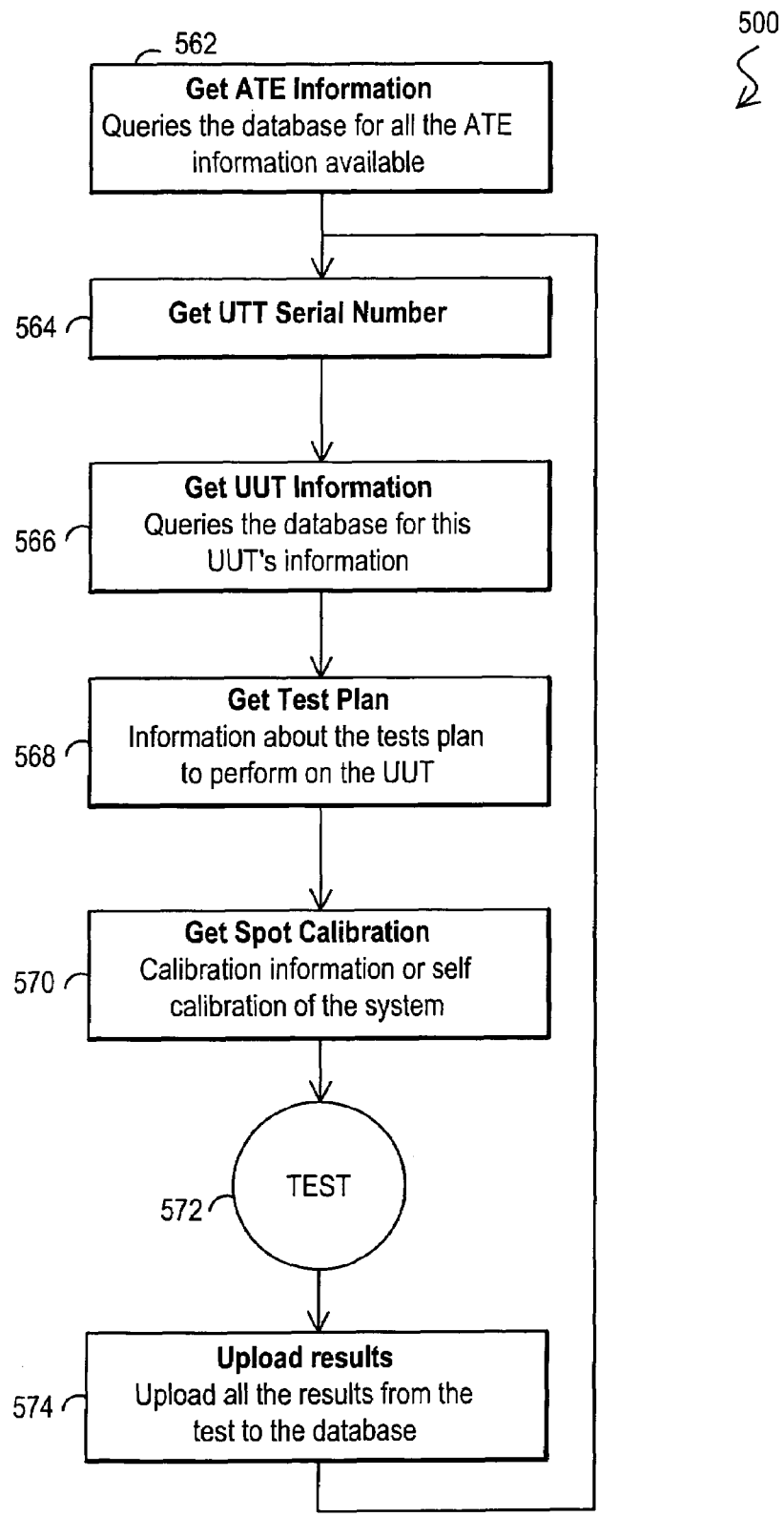
FIG. 5 is a flow diagram for test cycle flow diagram for automated test equipment (ATE) or test systems that include an ETCM module, according to the present invention.

FIG. 5 is a flow diagram for test cycle flow diagram for automated test equipment (ATE) or test systems that include an ETCM module, according to the present invention. The ATE test cycle process 500 starts with block 562 where the ETCM component 108A queries the ETCM system and database 100 to obtain all information for the ATE that is available in the ETCM database. This ATE information is utilized to configure and operate the ATE to conduct testing of the UUT. In block 564, serial number information for the UUT is obtained. In block 566, the ETCM component 108A queries the ETCM system and database 100 to obtain all information for the UUT that is available in the ETCM database. Next, in block 568, the ETCM component 108A queries the ETCM system and database 100 to obtain test plan information for the UUT. In block 570, calibration information is obtained, or self calibration of the ATE system is executed. The test for the UUT is executed in block 572 after which the test results are transmitted or uploaded in block 574 to the ETCM system and database 100, for example, as described above with respect to FIGS. 3A-3C. It is noted that in querying the central database for information, data modified by a user who is logged into the ETCM system and database 100 can be given effect. This data can then be updated onto the test stations. This tool, therefore, can not only make sure that the test data and configuration information is available for the test station, depending on how the test station has been developed, this tool can also react to the change of information in a variety of different ways.

Figure 6:
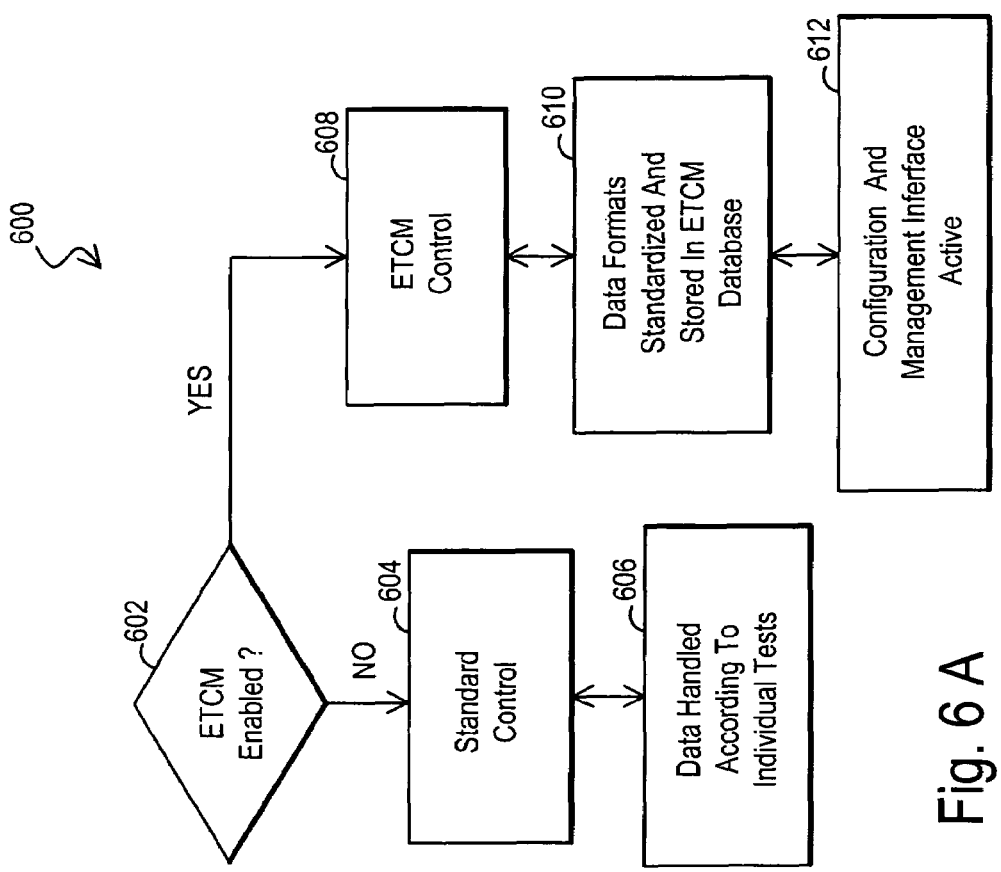
FIG. 6A is a flow diagram for selectively choosing whether ETCM control is used with respect to test software installed and operating on a local test station, according to the present invention.
FIG. 6B is a block diagram for a local test station having an ETCM enable module that may be set to enable or disable processing by the ETCM component, according to the present invention.
Figure 6:
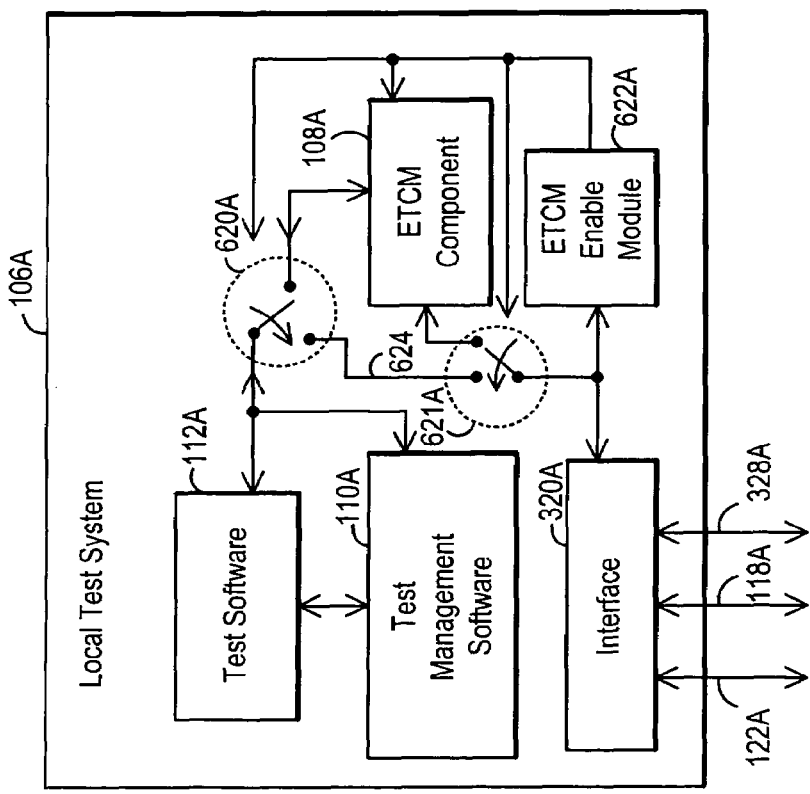

FIG. 6A is a flow diagram for selectively choosing whether ETCM control is used with respect to test software installed and operating on a local test station. Process 600 provides for processing with or without the ETCM component. Decision block 602 determines whether ETCM processing is enabled or not enabled. If the answer is "no," standard control block 604 acts to control test activities according to the software installed on the local test station. Block 606 represents that data is handled according to individual tests running on the local test stations. Thus, there is no standardized data format and there is no centralized data storage in a readily accessible database system. If the answer is "yes," however, ETCM control occurs in block 608. As indicated in block 610, data formats from disparate test stations are standardized and stored in a centralized ETCM database. In addition, as indicated in block 612 an ETCM configuration and management interface becomes active allowing for remote users to log onto the ETCM servers and the configure and manage test activities, for example, through an Internet connection and a browser program.

FIG. 6B is a block diagram for a local test station 106A having an ETCM enable module 622A that may be set to enable or disable processing by the ETCM component 108A. The interface 320A provides access from external devices to the local test station 106A. The test software 112A and the test management software 110A are traditionally designed, installed and operated to conduct a particular desired test of a UUT. As discussed above, the ETCM component 108A allows for advantageous management of test data activities. The connection 122A is connected raw data archive system 102, and connection 118A is connected to the ETCM system and database 100, as depicted in FIG. 1A. The connection 328A is provided for other device operation interactions, as shown in FIG. 3A. The ETCM module 622A is accessible through the interface 320A and allows selective enabling or disabling of the ETCM component 108A. When ETCM control is enabled, the switches 620A and 621A are set to allow information to pass through and be controlled by the ETCM component 108A. When ETCM control is disabled, the switch 620A and 621A are set so that information passes along line 624 so that the information bypasses and is not controlled by the ETCM component 108A.

The switch 620A, the switch 621A and the ETCM enable module 622A may be any desired technique for selectively enabling processing by an ETCM component of a test station. For example, the ETCM component 108A may be software-based processing that is installed as part of the test software. The ETCM enable module 622A and the switches 620A and 621A may essentially be a software switch that is set through the interface 320A. This software switch may determine whether or not the ETCM component installed on the test station 106A operates. In addition, the ETCM enable module 622A and switch 620A could be implemented through a software patch that is installed and executed on the test station 106A at a later date.

Advantageously, the ability to selectively enable the ETCM component 108A provides significant flexibility in test installations and operations. For example, if a company does not have the connectivity infrastructure to effect the transmission of information from a test floor where the test stations are located, the company can still include the ETCM component 108A in a software installation on the local test station 106A. In this way, when the connectivity infrastructure is constructed in the future, the ETCM component 108A can be enabled with little additional effort. Other advantageous uses of this selectivity are also situations where the connectivity infrastructure is in place, but the company nevertheless chooses not to utilize the ETCM control. In addition, even if the connectivity infrastructure is not in place, the ETCM control may be enabled, leading to data storage in the ETCM data storage 322A, as discussed with respect to FIGS. 3A-3C. In this way, for example, standardized data can be offloaded manually from the local test station 106A through interface 320A and then transferred to the ETCM system and database 100, if desired. In short, this selective enabling provides significant flexibility and efficiency advantages.

Further additional advantageous features for an ETCM system are now described. And examples embodiments are shown with respect to FIGS. 7A-C, 8, 9, 10, 11A-E and 12.

ETCM TEST DATA MODEL

In a testing environment, it is often the case that each product has to undergo several tests during production and development. Each test usually consists of several test steps. And each test step can generate a result or a set of raw data that could be used to determine the final result. Generating a model generic enough to be able to model all the different permutations and combinations of test data required by multiple products and tests is very difficult, particularly if this model is to be configurable so that it can be effective for a plurality of enterprises.

The test data model of the present invention solves this problem by providing a method of hierarchically modeling test structures and test data. The test data model described herein includes in part product test objects (PTO), test procedure objects (TPO) and result table objects (RTO). Each PTO can include one or many TPOs and one or many RTOs; each TPO can contain one or many TPOs and one or many RTOs, and each RTO can contain one or many RTOs. The resulting model is extremely flexible and can model practically any test and test data. The TPOs and the PTOs have the capability to store a set of default properties and any number of custom properties. These properties can be used to store the data generated by the TPOs and PTOs in the test system, and they could be used to store any type of data generated by the test system (for example Integers, Floating points, Strings, Doubles, etc.).

In addition to the test data model, the ETCM system of the present invention allows the creation of custom objects (CO) that allow users to define and store useful data for test operations and such data can be linked for use throughout the test data model. For example, the configuration data used by the test during execution can be defined in one or more COs. This configuration data can be used by the test to determine the result of the tests being executed on the UUT. The advantage of storing configuration information in the ETCM database is that it provides a central location that permits a single point of change and control. This makes it simple to change the test specifications and immediately have these changes become effective on the test system. In addition to configuration data, other types of useful or custom data information can be stored in COs, as desired. For example, data for temperature translations or thermodynamic ratios can be stored in COs for use during test operations. Still further, test request information could be stored in a CO that keeps track of who requested a test to be run. In short, COs provide a useful data object within which to store a wide variety of user-defined data for test operations. And as discussed below, these COs can be linked to any other data object within the test data model, including PTOs, TPOs, RTOs, TSOs and other COs.

Figure 7A:
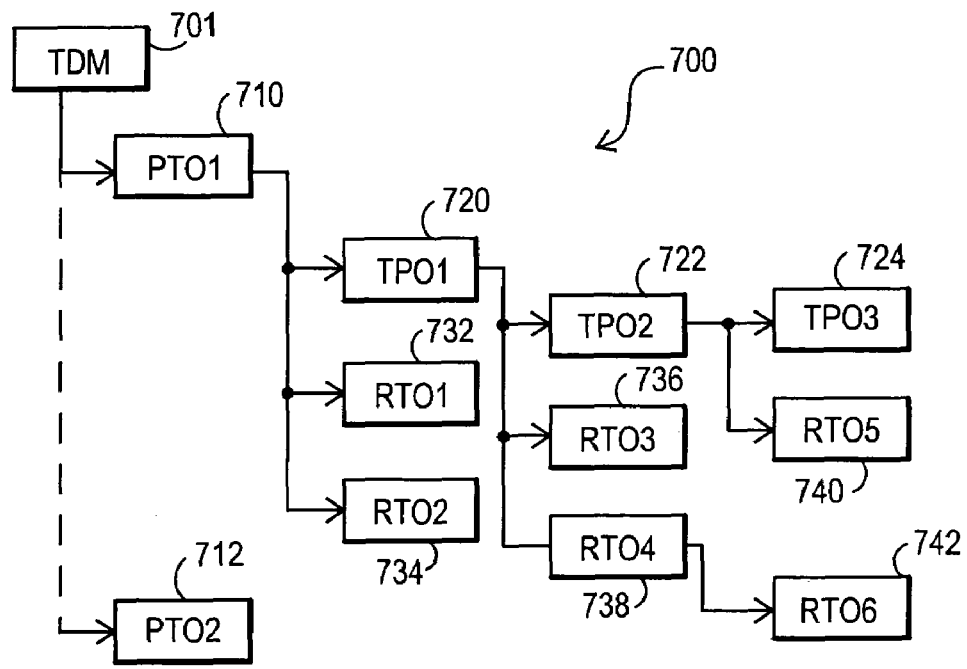
FIGS. 7A, 7B and 7C are block diagrams for example test data models according to an aspect of the present invention.
Figure 7B:
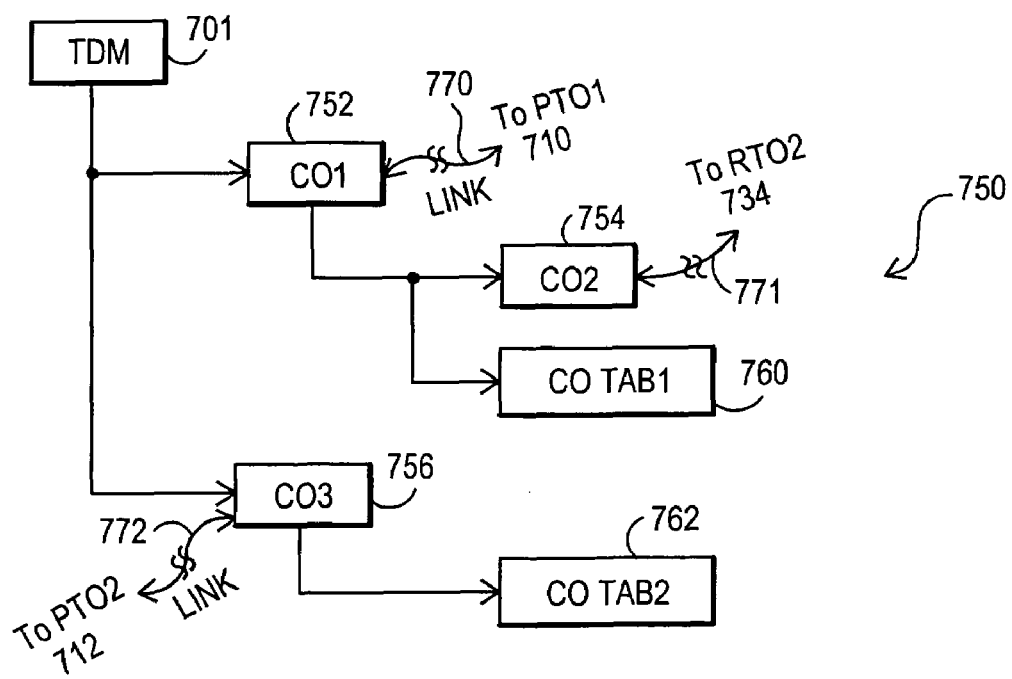

FIGS. 7A and 7B provide example embodiments for a hierarchical test data structure or test data model 701 including PTOs, TPOs, RTOs and COs. As shown in FIG. 7A, PTO 710 includes hierarchically underneath it TPO1 720, TPO2 722 and TPO3 724, as well as RTO1 732, RTO2 734, RTO3 736, RTO4 738, RTO5 740 and RTO6 742. One or more additional PTOs, such as PTO2 712, can also be included with a hierarchical structure underneath it. As shown in FIG. 7B, COs can also be hierarchically structured within the test data model 701. As shown, CO1 752 and CO3 756 are included hierarchically under test data model 701. CO2 754 and CO TAB1 760 are included hierarchically under CO1 752. And CO TAB2 762 is included hierarchically under CO3 756. In addition, COs can be linked to PTOs, RTOs, TPOs, TSOs or any other data object within the test data model 701 so that those linked data objects can use the data within the CO for test operations. Example data links are represented by the links 770, 771 and 772. As shown, link 770 links CO1 752 to PTO1 710. Link 771 links CO2 754 to RTO2 734. And link 772 links CO3 756 to PTO2 712. It is noted that with respect to FIGS. 4A-C, items 412A-C can be correlated to a PTO; items 414C and 416A-C can be correlated to a TPO; and the items 418A-C can be used as an RTO.

The ETCM test data model also defines how the data will be stored in the ETCM database. Test data is typically generated every time a unit of a product is tested on a test system. All test data related to a unit of product can be referred to as a test instance or a test execution. In the ETCM system, this data is treated as an instance of an execution of the PTO. Each execution of the PTO on any unit under test (UUT) is treated as a discrete set of data that can be individually identified and queried for reporting. Each set of the above data is called an "Execution Instance." During the execution of any PTO, any of the objects underneath it in the data model can be executed multiple times. For example, if a PTO A has two TPOs B and C underneath it, for a single execution, A, B and C could have had multiple iterations which are also stored as discretely identifiable instances. These are called "Iterations" and there can be multiple Iterations of any object within a single Execution Instance.

In addition to being able to model the test data and configuration information, the test data model can also store information about the test stations themselves as test station objects (TSOs). These TSOs can be used to store static and dynamic information about the test stations. Information such as last calibration date, location, authorized operator's etc. can be stored using the test data model. This information can be accessed by the test software using the ETCM client software and used to make control decisions on the test execution.

Figure 7C:
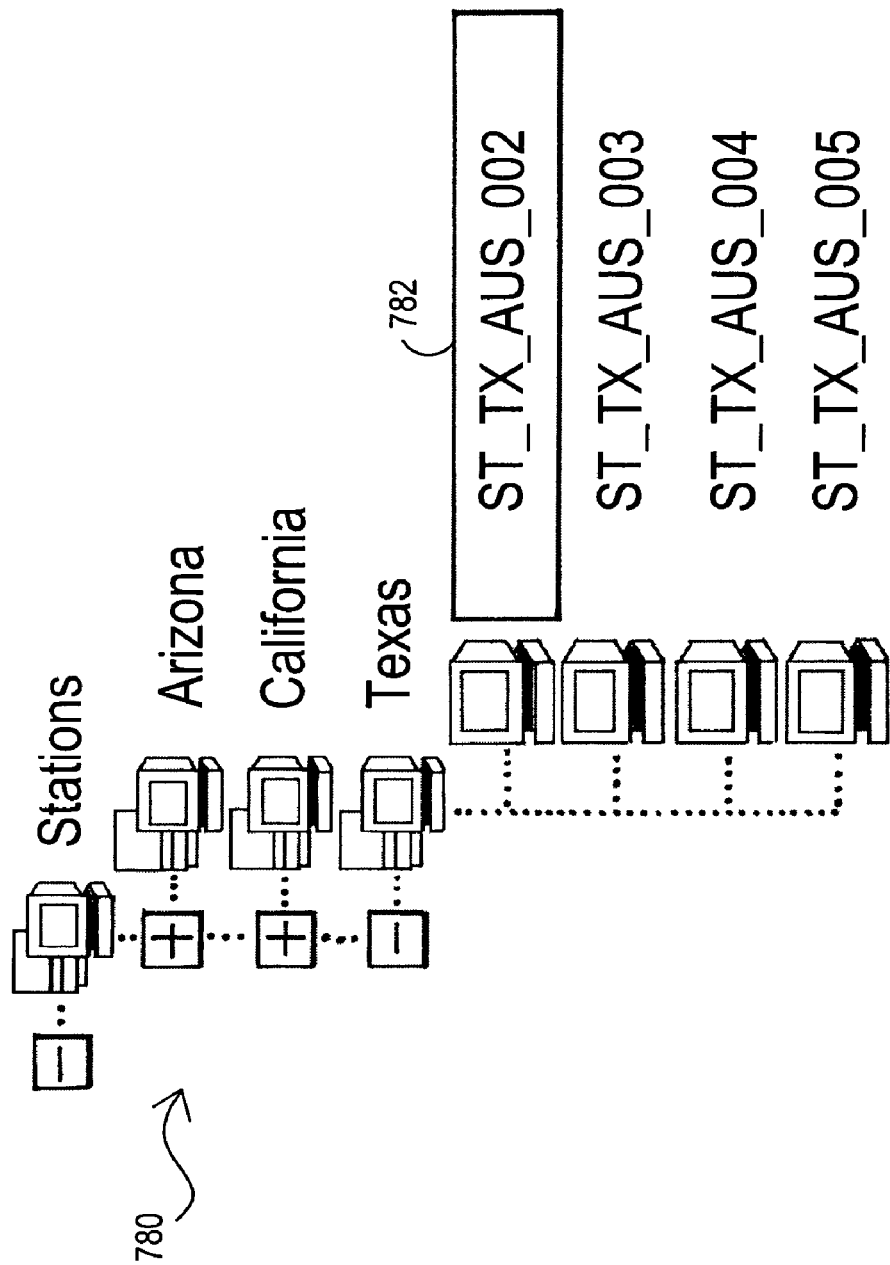

FIG. 7C shows a hierarchical view 780 of a set of TSOs. Locations Arizona, California and Texas are included hierarchically under the top level indicator labeled Stations. Individual TSOs, such as selected TSO 782, are hierarchically under the location indicator Texas. Four TSOs are shown in FIG. 7C, namely, ST_TX_AUS_002, ST_TX_AUS_003, ST_TX_AUS_004, and ST_TX_AUS_005.

Thus, as shown in FIGS. 7A, 7B and 7C, the database software of the present invention has data objects that represent different elements of a test. The PTO (Product Test Object) can contain a wide variety of information concerning the product test, including data about the results of a test, and a PTO, as with other data objects, can include sub-objects hierarchically positioned below the PTO. In the examples above, these sub-objects are the TPO (Test Procedure Object) that includes default test related properties and the RTO (Result Table Object) that includes test results. TPOs can include a wide variety of information concerning test related procedures, such as test properties or test process details, that can be used in the test operations. RTOs can include a wide variety of information concerning test results including data tables for test results. The TSO (Test Station Object) contains data about the physical test station including information about groups of test stations, as well as information about individual test stations. The CO (Custom Object), as discussed above, can contain data that instructs the test how to run or what makes a test successful.

The hierarchical test data model of the present invention, which includes a number of different data objects, provides a widely flexible system for structuring test operations related data, including test procedure data and test results data. According to the embodiments depicted, the test data model, for example, can be structured to include a PTO associated with each product test operation within an enterprise. Each PTO can then be configured to include data concerning the nature of that product test operation. The PTO could then be structured to have TPOs and RTOs hierarchically positioned underneath it. The TPOs can include data related to the operation of the test, while the RTO can include result data for the test. TSOs are then used to store data concerning the test stations themselves. And COs are used to stored configuration data, look-up table data, requestor data, or any desired custom data information that is used for the test operations. As discussed herein, these different data objects can be structured and linked, as desired, to form a test data model that accurately and efficiently represents the test activities and operations of an enterprise, and the flexibility of the hierarchical test data model of the present invention provides a highly configurable and efficient system for creating and configuring this test data model.

Object Data Linking and Data Propagation for the Test Data Model

Previously, a uniquely programmed test program would require a user to discretely enter all test data for each execution of a test. With respect to data object linking, the test data model utilizes links between data objects so that data in one data object can be automatically used by another linked data object for test operations. These data object links can be provided between any desired data objects within the test data model, including PTOs, TPOs, RTOs, TSOs and COs. With object data propagation, the test data model utilizes links between data within data objects so that data from one data object can be automatically propagated to data fields in a linked data object. These links, therefore, can be used to propagate data up or down the hierarchical chain whenever required, or they can be used to propagate data horizontally to different data objects within the test data model that are not hierarchically related. Thus, data propagation links can be provided between any desired data objects within the test data model, including PTOs, TPOs, RTOs, TSOs and COs. It is also noted that the data need not always be propagated, as the user still has the option of entering the data discretely.

Object data linking and propagation according to the present invention makes development of the test station software easier by freeing the developer from having to manually create all the links required between all the related objects in the test system. This also helps improve the performance of the test station software as it allows the software to populate a number of auto propagation data fields by specifying the value of any one of fields. The test software is also more robust because it does not have to maintain the links between all the objects used by the test system. Without the ETCM system maintaining the links between all the related objects, the test system developer would be forced to do so. This prior requirement makes development of the test software much more complicated and, therefore, much more expensive.

The test data model can also link objects that are not hierarchically related. This ability, for example, makes it possible to create a link between a TSO and a PTO that are not hierarchically related. Using a link like the one described above, for example, enables the test station software developer to use a data field such as the last calibration date of the TSO to determine if it is acceptable for the test software to execute the test. This data linking capability also allows the test data model to create a link between PTOs and COs and between TPOs and COs. This additional capability allows a single CO to be used by multiple PTOs and TPOs to access configuration information.

Figure 8:
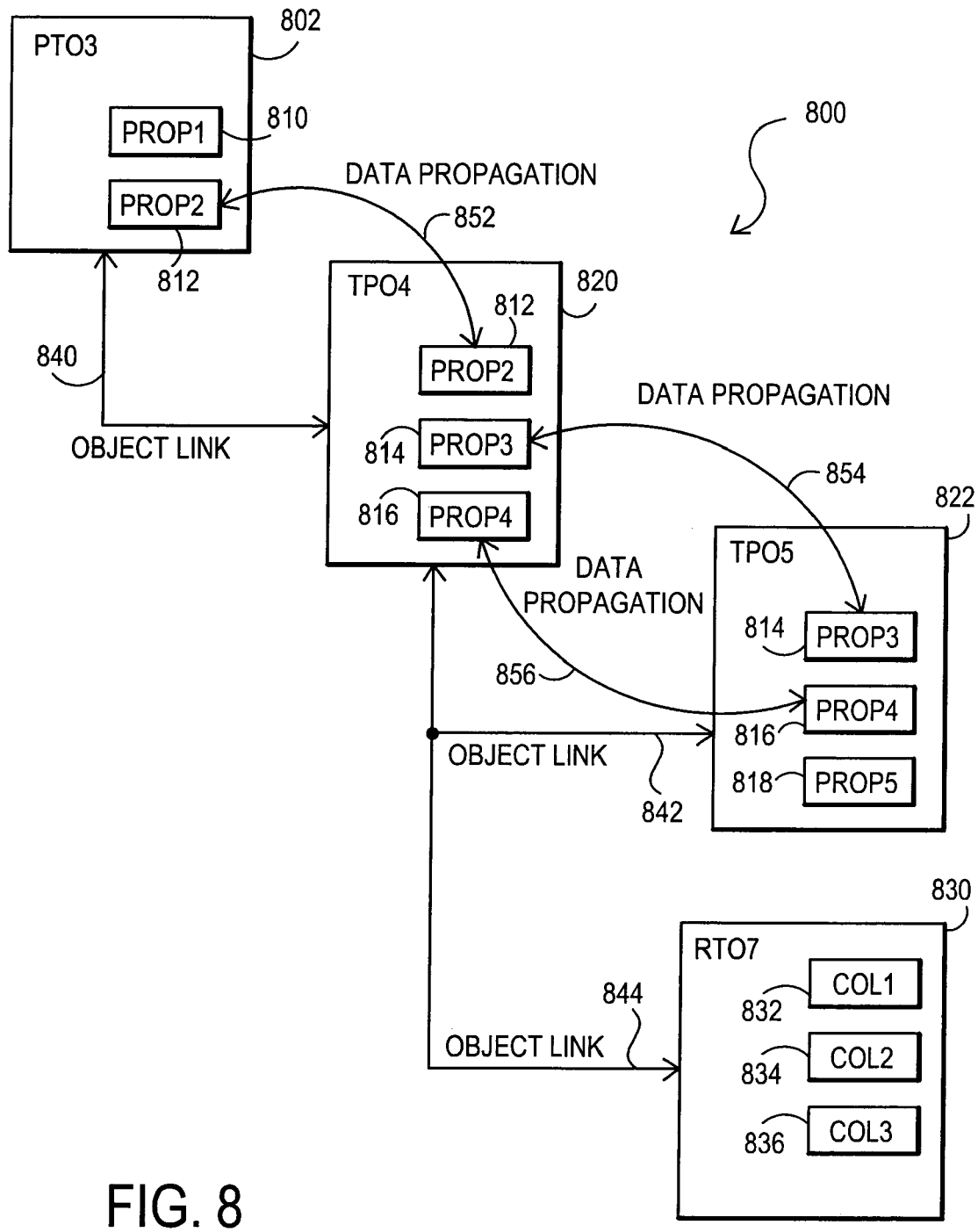
FIG. 8 is a block diagram for data propagation according to an aspect of the present invention.

FIG. 8 provides a block diagram for an embodiment of test data model propagation links according to the present invention. PTO3 802, TPO4 820, TPO5 822, and RTO7 830 each includes test related data that can be linked for data propagation purposes. For example, PTO3 802 includes properties PROP1 810 and PROP2 812. And data propagation link 852 links PROP2 812 to the same property in TPO4 820. Similarly, TPO4 820 includes properties PROP2 812, PROP3 814 and PROP4 816. Data propagation link 854 links PROP3 814 to the same property in TPO5 822, and data propagation link 856 links PROP4 816 to the same property in TPO5 822. TPO5 includes properties PROP3 814, PROP4 816 and PROP5 818. RTO7 830 includes data columns COL1 832, COL2 834 and COL3 836. Object links are also represented in FIG. 8 by object link 840 that links PTO3 802 to TPO4 820, by object link 842 that links TPO4 820 to TPO5 822, and by object link 844 that links TPO4 820 to RTO7 830.

One example for data that can be propagated using the hierarchical propagation links described above is the part number of a product test. Through the use of hierarchical links, the part number can be propagated to all test procedures for that part. Using object data linking, information such as a test station's instrument calibration date can be linked to each product test that uses the station. In addition, as stated above, objects can be linked to multiple other objects, for example, a custom object can be linked to multiple test objects.

Automatic Creation of Default Data Properties for the Test Data Model

The ETCM can provide, if desired, automatic creation of default data properties for the test data model. More particularly, the ETCM includes a feature that allows the user to configure the default properties that are created every time a TPO or a PTO is created. The user can also configure the linking and propagation associations of the default properties. The properties that are created by default are not required to have any data associated with them when they are created, and the default properties can be modified or populated by the user, as required. This default properties feature of the present invention advantageously allows the user to customize the test data model for specific requirements of the enterprise that is using the test data model.

Data Entry Graphical User Interface Creation

Another feature provided by the test data model is that it allows for the effortless creation of data entry graphical user interfaces (GUIs). The feature is very useful to users who do not wish to, or do not have the capability to develop a program to transfer data from the test infrastructure into the ETCM database. This feature provides a "no effort" way to create a custom GUI to enter test data into the ETCM database. This feature is made available to users for them to enter data into any test available in the ETCM system whether modeled using the ETCM administration utility or dynamically generated by the ETCM system.

The user selects an available PTO in the ETCM database and brings up the data entry GUI by clicking on the appropriate menu item. Clicking on the CREATE NEW EX button in the Data Entry GUI creates a new execution instance. The GUI allows the user to enter data into all the defined object properties. The GUI is split into two frames, one displays the tree view of the hierarchical test data model, and the other frame displays all the properties that are available in the node selected on the tree view. A table provides the ability to enter data into the RTOs. After all the data has been entered into the GUI, the user can press the Save Data button, and the program will collect all the data and save it into the ETCM database. To enter another set of values into the database, the user can then create another execution instance of the PTO by clicking on the CREATE NEW EX button.

Figure 9:
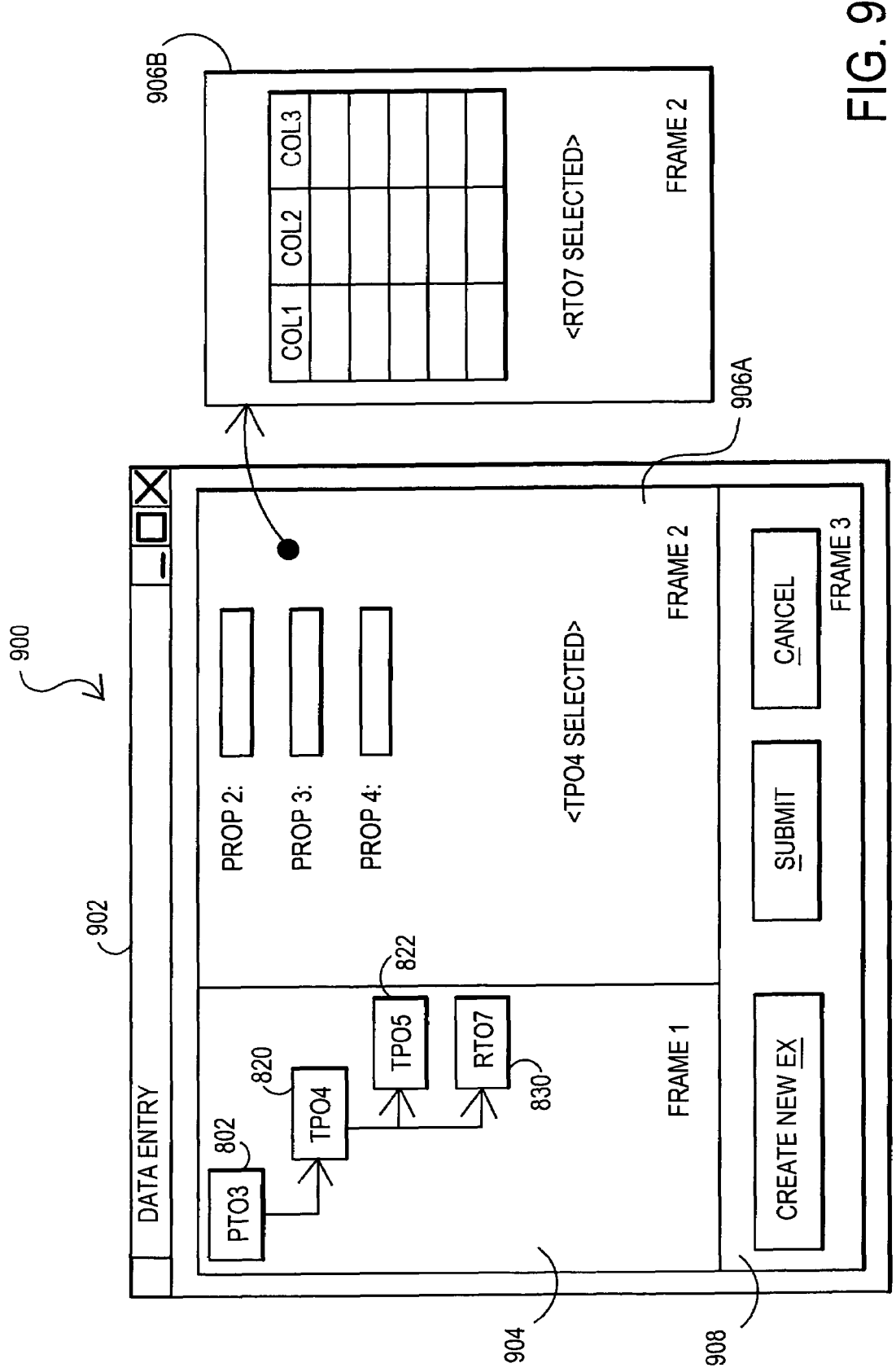
FIG. 9 is a block diagram for a data entry graphical user interface according to an aspect of the present invention.

FIG. 9 provides an example embodiment 900 for a graphical user interface (GUI) for data entry. As depicted, a data entry window 902 includes three frames: FRAME1 904, FRAME2 906 AND FRAME3 908. The test data model hierarchy is included in FRAME1 904. For example, as depicted, FRAME1 904 includes PTO3 802, TPO4 820, TOP5 822 and RTO7 830. The information in FRAME2 906 depends upon the item selected in the test data model hierarchy in FRAME1 904. For example, if TPO4 is selected, the information to this selection is displayed. As depicted, this FRAME2 content 906A includes PROP2, PROP3, PROP4, and their related data entry fields. Thus, when TPO4 820 has been selected, data input fields for properties PROP2, PROP3 and PROP4 are automatically provided in FRAME2 906A so that data can be input into those fields. If a different element in the test data model hierarchy within FRAME1 904 is selected, such as RTO7 830, the information within FRAME2 906 changes accordingly. When RTO7 830 is selected, therefore, the FRAME2 content 906B for RTO7 830 is displayed in FRAME2 906. As depicted, this content 906B includes data entry input fields for COL1, COL2 and COL3. And depending upon the object selected in the hierarchical tree in FRAME1, FRAME2 will include data input fields for the defined data fields in the data model. Thus, if RTO7 830 is selected, data input fields for data columns COL1, COL2 and COL3 are automatically provided in FRAME2 906B. It is also noted that FRAME3 908 includes control buttons, such as the SUBMIT, which submits the entered data, and the CANCEL button, which cancels the operation. In addition, FRAME3 includes a CREATE NEW EX button that acts to create a new execution instance of the PTO, as discussed above.

ETCM TEST DATA STRUCTURE CREATION

The present invention provides several mechanisms for automatic creation of data structures. The first mechanism described below provides a run-time mechanism for dynamically creating data structures in the ETCM database for test result data as it is generated during product testing. The second mechanism described below provides a data file mechanism for automatically creating data structures in the ETCM database for test result data based upon an automatic analysis of test data result files.

Dynamic Test Data Structure Creation at Run-Time

The test data model of the present invention allows the user to choose to have the system automatically configure the database structure at run-time to add a column or property field to the PTO, TPO or RTO. This happens when the test software sends data to the server that needs to be stored in a location that has not been configured prior to run-time by using the either the ETCM administration utility or a field that was dynamically added prior to the current test run. This preference can also restrict the type of data configuration that can be done at run-time. The restriction can be placed on the type of data and on the type of data objects. This feature is extremely useful in an intelligent test station that could determine at run-time if additional data fields need to be stored for any test. If such a determination is made, then the data is sent to the ETCM server in a manner similar to the data for any pre-configured data field. And the ETCM system will modify the database to allow the data to be stored. This dynamic test data structure creation capability is also useful in other situations, such as where the test designer adds a new data field to the test results and then runs the test software. When the test results are uploaded to the ETCM database, the system determines that a new data field has been added to the results and appropriately modifies the database structure to facilitate the storage of the new data.

Without the dynamic test data structure creation of the present invention, the test system developer would be forced to first modify the fields or object in the test data model before any new type of data could be stored in the ETCM database. And if this manual creation were not done before the test were run, the database would refuse to store the data, as it would not know where and how to store the data. As such, the dynamic test data structure creation is very advantageous to the test software developer as it enables adding new fields to the database and the test data model without having to manually add/modify the existing data model. This feature, therefore, enables the development of new types of intelligent test station software that can determine at run-time if new data needs to be acquired and stored in the database even if the database has not already been configured to store the data.

Figure 10:
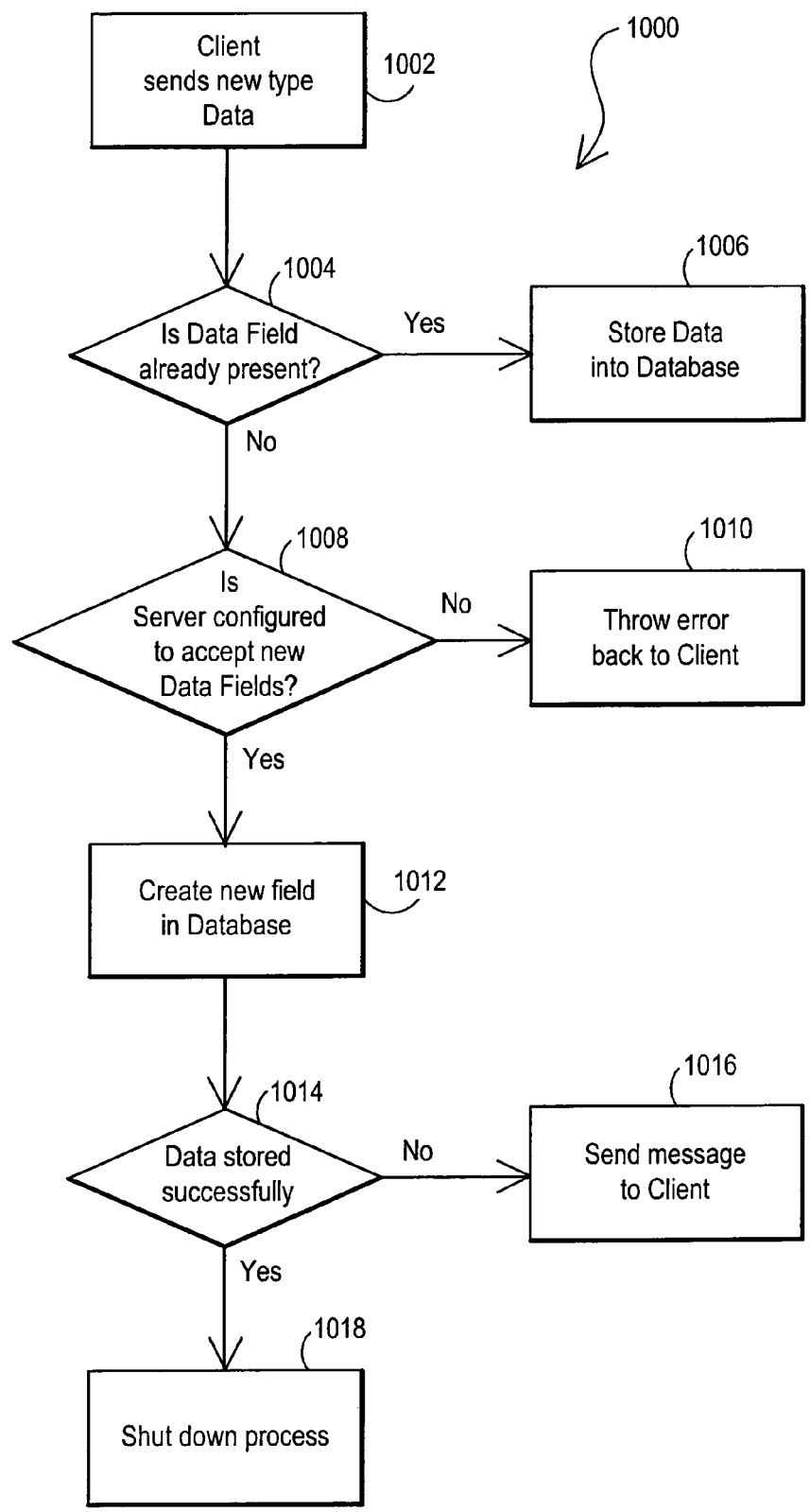
FIG. 10 is a process flow diagram for dynamic test data structure creation according to an aspect of the present invention.
Figure 11E:
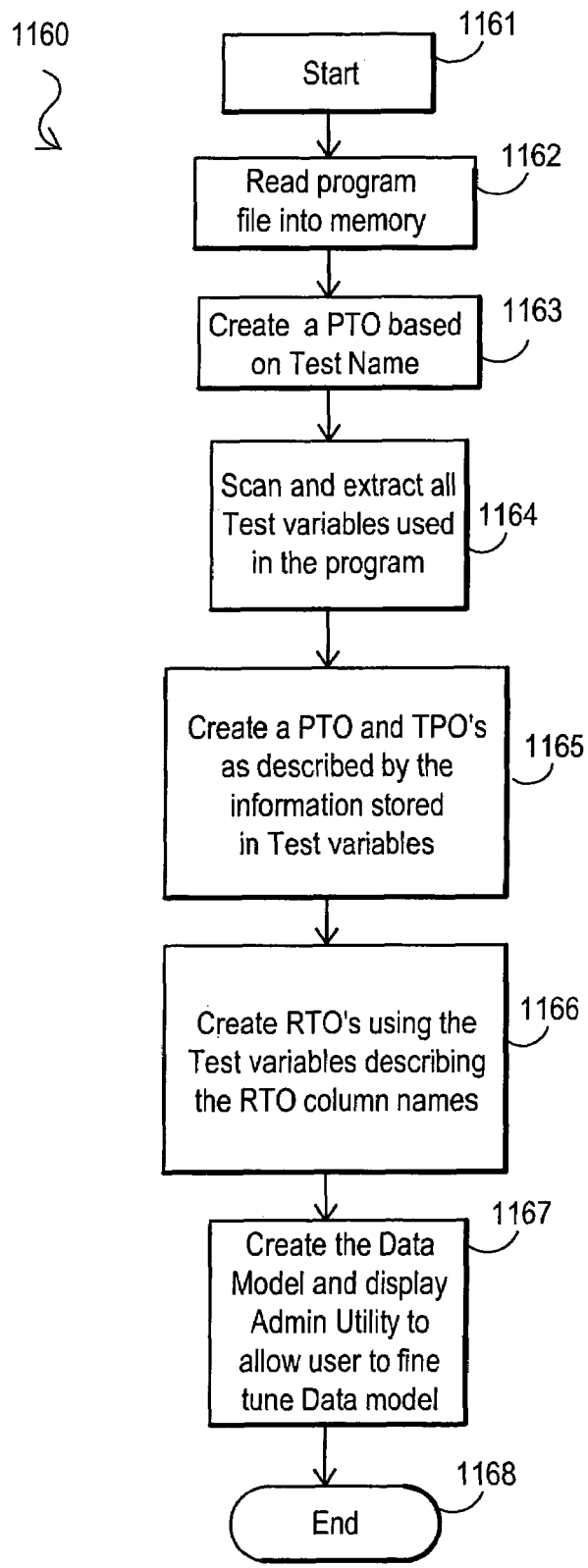

FIG. 10 provides a flow diagram for an example process 1000 for dynamic test data structure creation. It is noted that as used herein, the term client refers to software operating with respect to units or devices under test. In the discussion above, this software module is typically referred to as the ETCM component, and the ETCM client is referred to as a separate system that monitors ETCM data and management operations through a network connection. Thus, the term client is being used in both circumstances to refer in one case to client software and in another to refer to a client monitoring system.

As discussed above, for example with respect to FIGS. 1A and 1B, automated test equipment (ATE) can be connected to an ETCM server through a network connection, such as a hardwire or wireless network (N/W) interface link. In block 1002, the client sends new data of a defined type to the ETCM server to be managed and stored. In decision block 1004, a determination is made concerning the question: "Is the data field already present?" If "yes," then flow passes to block 1006, where the data is stored in the ETCM database. If "no," then flow passes to decision block 1008, where a determination is made concerning the question: "Is the server configured to accept new data fields?" If "no," then flow passes to block 1010, where an error message is communicated back to the client software running at the ATE. If "yes," then flow passes to block 1012, where a new field of the proper data type is created in the ETCM database to store the new data. Decision block 1014 is then reached, where a determination is made concerning the question: "Data stored successfully?" If "no," then flow passes to block 1016, where an error message is sent to the client. If "yes," then flow passes to block 1018, where the dynamic data structure creation process is shut down for this cycle.

Automatic Test Data Structure Creation from Existing Files

To add further functionality and ease to the creation of data structures within the test data model and the ETCM database, the ETCM system allows for the automatic creation of data structures from an automatic analysis of existing files. More particularly, the system can automatically generate suitable test data structures by reading pre-existing test data files, source code of program execution files and configuration files. This feature of the ETCM system enables easy transition of legacy test systems to a database driven system like ETCM test data management system. One of the major tasks in transitioning an existing test system and saving data to files to the ETCM system is creating the appropriate data structures within the ETCM test data model, such that data generated by the test system can be stored appropriately. An automated data structure creation system reduces the time required to create the test data models. When the model has been created, the user can use the automatic code generation system described below to generate code that can be included in the test system software and that will operate to upload new test data directly into the ETCM system. Advantages of this automated system include its generic structure and its ability to create the data model from any type of source file. This generic importing mechanism of the present invention, for example, allows for test data generated by Test System A to be used to generate the data model for a data file for Test System B. Thus, this generic test data structure creation system provides significant advantages for enterprise wide deployments in companies with large test infrastructures that include legacy test systems. Once this ETCM system feature has been used to create a Test Data Structure using a data file, the ETCM system can use the capability described below with respect to the Automatic Configurable Test Data Import Utility to read in large numbers of previously stored data files into the ETCM database.

The following provide some example file formats from which data structures for the ETCM database can be automatically generated.

1) Flat File Formats (proprietary, unique data organization)—Non-standard data format are first understood through questioning of user, and then the test structures are created based upon the data formats (see FIG. 11A and discussion below).
2) Standard Data File Formats—Standard file formats, such as STDF, are read by the tool, and the data structures are generated (see FIG. 11B and discussion below).
3) Test Sequence Files—A test sequence file does not contain data, but contains the steps a test program will execute. Test sequence file (i.e. TestStand or Test Executive files) are read, and data structure structures are generated based on the test sequence file. Updates or modifications to the test sequence file then automatically update the data structure (see FIG. 11B and discussion below).
4) Graphical Files—Read a graphical program file and automatically generate the test structure (see FIG. 11C and discussion below).
5) Text Based Files—Text based test program file, such as Visual Basic, Visual C++, C#, or LabWindows/CVI, is read, and then the test structure is automatically generated (see FIG. 11D and discussion below).
6) Test Program Configuration Files—Test program configuration file is read, and then the test structures are automatically generated (see FIG. 11D and discussion below).
7) ETCM Variables—ETCM variables are specifically designated variables that are used by the ETCM importer to create a data model. The ETCM variables can be used in text and graphical programs to designate data that needs to be stored in the database. The software tool scans the code that uses these variables, detects them, and generates a data structure based on the code (see FIG. 11E and discussion below).

The methods for Flat File Formats (1), Text Based Files (5), and Test Program Configuration Files (6) can be implemented wizard-based systems that will scan the given file and display a wizard to the user to enable them to select which fields will be created in the ETCM model. Methods for Standard Data File Formats (2), Test Sequence Files (3), Graphical Files (4), and ETCM Variables (7) require little or no understanding of the test application to automatically create the test data structure. As indicated above, FIGS. 11A-E provide example block diagrams for automatic test data structure creation.

Looking first to FIG. 11A, an example process flow 1100 is described for creating data models from flat files and/or standard data files. After start block 1101, the data file is read into memory in block 1102. Next, in block 1103, a PTO based on the test name is created. In block 1104, all header information is then scanned for individual tests within the overall test file. In block 1105, the first test is selected, and a correlating TPO is created in block 1106. In block 1107, a scan is then conducted for the names of all the columns of data, and an RTO is created using the names. Next a decision block 1108 is used to ask the question "Is there a next test available?" If "Yes," then flow passes to block 1110 where the next test is selected. Flow then passes back to block 1106 where a TPO is created for the next selected test. In addition, for this new test, a scan is conducted in block 1107 for the names of all the columns of data, and an RTO is created using the names. This loop is repeated until all tests are scanned. When the answer in decision block 1108 is "no," then flow passes to block 1109 where a draft data model is generated and displayed through an administration utility (Admin Utility). The user can then fine tune or edit the data model, as desired. The process then proceeds to the end block 1112.

FIG. 11B provides an example process flow 1120 for creating data models from a test sequence file from a Test Executive Software. After start block 1121, the test sequence file is loaded into memory in block 1122. Next, in block 1123, a PTO based on the sequence file name is created. In block 1124, the file is then scanned for discrete tests. In block 1125, the first test is selected, and a correlating TPO is created in block 1126. Output variables inside the test are then found in block 1127, and an RTO is made with columns created having the output variable names in block 1128. Next a decision block 1129 is used to ask the question "Is there a next test available?" If "Yes," then flow passes to block 1130 where the next test is selected. Flow then passes back to block 1126 where a TPO is created for the next selected test and processed like the first one. This loop is repeated until all tests are processed. When the answer in decision block 1129 is "no," flow passes to block 1132 where a draft data model is generated and displayed through an administration utility (Admin Utility). The user can then fine tune or edit the data model, as desired. The process then proceeds to the end block 1134.

FIG. 11C provides an example process flow 1140 for creating data models from a program written in a graphical programming language. After the start block 1141, the program file is loaded into memory in block 1142. Next, in block 1143, a PTO based on the program name is created. A TPO is then created using the module name in block 1144. In block 1145, the file is then scanned for output variables. In block 1146, a result table is then created with columns having the output variable names. In block 1147, a draft data model is then generated and displayed through an administration utility (Admin Utility). The user can then fine tune or edit the data model, as desired. The process then proceeds to the end block 1148.

FIG. 11D provides an example process flow 1150 for creating data models from a text-based program, such as C or Visual Basic. After the start block 1151, the program file is read into memory in block 1152. In block 1153, all variables in the program are then extracted, including their context information. In block 1154, a display wizard is then used to allow a user to select the variables to be used in creating the data model. In block 1155, a display wizard is also used to allow the user to name the required PTOs, TPOs and RTOs. In block 1156, a draft data model is generated and displayed through an administration utility (Admin Utility). The user can then fine tune or edit the data model, as desired. The process then proceeds to the end block 1157.

FIG. 1E provides an example process flow 1160 for creating data models from a test program using test variables. After start block 1161, the program file is then read into memory in block 1162. Next, in block 1163, a PTO based on the test name is created. In block 1164, a scan is then conducted for all variables used in the program, including definition information related to those variables. In block 1165, PTOs and TPOs are then created as described in this definition information stored about the variables. In block 1166, RTOs are then created using the variables and the described RTO column names. In block 1167, a draft data model is generated and displayed through an administration utility (Admin Utility). The user can then fine tune or edit the data model, as desired. The process then proceeds to the end block 1168.

Automatic Configurable Test Data Import Utility for the Test Data Model

The ETCM includes an import utility that allows test data to be automatically imported. This feature allows the user to easily migrate from file based test systems to the ETCM based test system architecture. A major challenge in moving from a file-based system to a database driven system, such as the ETCM system, is the transfer of all the historical data stored in files. The ETCM configurable data import utility is a program that can be configured to import data from files without any external assistance for each file.

To configure the program the user first loads in a sample data file. The program then identifies all the header or file identification information in the file and displays it to the user. The user can then map this header information to the properties of any data object in the ETCM test data model, including PTOs, TPOs and/or RTOs. The program then finds and displays all of the data in the file, including, but not limited to, test result data, pass/fail data or any other data stored within the file. This data information can be mapped to any object in the ETCM test data model, including PTOs, TPOs and/or RTOs. For example, the user can then map each data table in the file to a corresponding RTO in the ETCM test data model. When this process is completed, the program stores all this mapping information in a named configuration file. After one or more configuration files have been created, the user can start the ETCM data import service by selecting one or more configuration files to be used and pointing the utility to one or more directories that hold the test data files. The data import service then loads each test data file, parses the data file using the information stored in the appropriate configuration file, extracts all the information out of the data file, and uploads the data into the database. This process will be continued until all the data files have been processed and loaded into the database. This feature can also be used in conjunction with the Automatic Test Data Structure Creation feature described above to both create the Test Data Model in the ETCM database and also transfer the data in the files into the database.

It is further noted that this feature can also be implemented as a background process so that as future data is created by the test system, the process will periodically look for data that is created and then import the data as the test station creates the data. This background process can run on the test station or on another computer, or on the server. When this module runs on a computer other than the test station or on the server, the import module can operate to fully manage the transfer of data to the database, if desired. In addition, a user can configure the location or locations to look for the files to be converted, identify a different mapping for each type of file, and configure the frequency that the process looks to see if new data is available. Thus, the automated import tool can be configured to operate to import data files as the data files become available, can be configured to operate to identify where within a file system it will look for available files, and can be configured to identify how often the tool will look for new files. And these import tool capabilities can be operated such that operator intervention is not required.

Existing generic programs for importing data into a database typically do not have the capability to import data from many different types of data files. These tools are often specific to the type of file involved and do not work on different files. The ETCM data import utility is a generic import program and has the ability to store the information about the different types of files that the tool has been configured to import. This gives the user the capability to import data from all the different test stations in the company and also to be able to use the existing test station software without modification and still have the data stored in the ETCM database. This feature is very important since some companies have test stations with software that cannot be modified or with software that has been written in a language that does not permit directly interfacing with enterprise test data management system, such as the ETCM system. Data file formats from which data can be imported may include, for example, XML data files, ASCH data files, spreadsheet data files, binary data file, etc. It is further noted that there are many data file formats that are derived from the ones mentioned. For example, ATML format is XML-based; comma-delimited and tab-delimited formats are ASCII-based; STDF format is binary-based, etc. In short, any desired data format can be utilized with respect to this aspect of the present invention.

Automatic Code Generation

The ETCM has the capability to automatically generate the programming code required to write data into the ETCM system database easily from several different programming languages including text based and graphical programming languages like Visual Basic, LabVIEW, Visual C++ and Visual Basic.NET. The user first creates the hierarchical model of the test data structure and then uses the ETCM Administration Utility to generate the programming code for the whole PTO and everything inside its hierarchy. This includes all the TPOs and all RTOs.

This code enables the user to quickly add the capability of transferring the test results generated by the test system to the ETCM system database. The code generated abstracts the details of the test data model system implementation into a simple object oriented interface making it easier for the user to add the test results into the database.

DATA COMMUNICATION TECHNIQUES

The ETCM system can also include additional communication techniques that facilitate the transfer of data through the ETCM system and its databases. An intelligent communication method is first described below, and a data staging method is then discussed.

Intelligent Communication Selection

The ETCM system transfers data from the test system to the database server using the ETCM client software. The ETCM client software can use multiple methods of communication with the server. The selection of the method can be performed automatically depending upon consideration such as the level of reliability required and the size and type of the data being transferred. This selection can also be made specifically by the user of the test station. Without the intelligent communication method of the present invention, a test system developer would have to learn about the different transfer methods, choose which was best for the current situation, and write the software to use that method. If the environment changed and a different method was needed, the developer would need to re-develop the application to use the new method. With the intelligent communication method, not only does the developer not need to know which method is best, but the ETCM system can automatically change the communication method if the system requirements change with requiring any changes to the test program.

If configured for automatic selection, the client software determines the method transparently to the user. These methods may include a variety of techniques, including, for example, the following:
1. Message Queuing
2. Interim data files
3. Direct transfer of data
4. Web services based data transfer When the test station has multiple types of network adaptors/media available and is connected to the network, then the ETCM client can also intelligently make a decision about which network media would be the best for transferring the data to the database. The types of network media could include 100 Base T, 10 Base T, Wi-Fi, Bluetooth and other types of networking technologies. Each of the above four communication methods has its advantages and disadvantages. The fastest data transfer method is likely the direct transfer of data where the client communicates directly with the database to transfer data. This method also has high likelihood of data loss due to network failures during transfer of data. The message queuing method is relatively slow but the reliability of data transfer is higher than with the direct transfer method.

Message Queuing:
This is a method of communication between a client and a server machine. The client that wishes to send data to the server packages the data in a specific format and transfers it to a message queue. Once the data package is in the message queue, the message queue server picks it up and then proceeds to transfer it to the destination computer. The message queue server does not need to reside on either the computer from which the data originates or the destination computer. The message queue system can be setup such that once the data package is assigned to the queue system, then the delivery of the message is guaranteed. The queue system includes the capability to store and buffer the messages on any number of computers in the path intermediate to the final destination computer. There are several commercial implementations of message queue systems in the marketplace that can be used to provide these message communications. The drawback of this system is that the client will typically not be able to deterministically state when the data will be written to the database.

Interim Data Files:
When the ETCM system is configured to use this method data files are first written on the test system computer when the test software passes test data to the ETCM client. Once the data is saved to the hard disk of the test station computer, the ETCM client starts trying to save the data to the ETCM database. When the data has been successfully saved to the database, the ETCM client will delete the interim data file that was stored on the hard disk. This method is relatively slower because the ETCM client first saves the data to the hard disk, then determines that the data is successfully saved to the database and then deletes the file from the disk. This method is slow but guarantees that the data is kept in local files till it is successfully written to the database.

Direct Transfer of Data:
This method is used when it is critical to immediately write the data to the database. When the test station software transfers the data to the ETCM client for storing into the database, the client software immediately opens a connection and sends data to the database. This is the fastest method of communication but has the disadvantage that if a network failure occurs when the data is being transmitted some loss of data could occur.

Web Services Based Data Transfer:
When the test station is at a location that does not have a direct internal network link with the ETCM database, the test data can be transmitted through the public Internet systems. To facilitate the transfer of data in a safe and secure manner, a web service can be used. The ETCM client hands over the test data to web service which packages it in a form that makes it easy to securely transfer over the public Internet. The time taken for transfer of data from the client to the database will not be deterministic due to the nature of the Internet. The advantage of using this method is that a dedicated connection need not be established between the test station and the ETCM client, thereby, reducing the amount of work required by the network administrators in configuring a firewall and other network infrastructure.

Data Communication—Data Staging

In an enterprise wide installation of the ETCM system, it is useful to have a staging system with local or departmental databases. A staging system allows users to edit, verify or confirm the data before it is uploaded into the enterprise database. This staging is very useful in the instances where all the tests need to be examined for errors before the data is loaded into the main database for enterprise wide availability. This process helps to keep erroneous results from being saved into the enterprise wide databases. In a simple staging system, the test data is stored on the test system in a local staging area. Once the data is reviewed using the management tool, it is then moved to the enterprise database. In a more advanced system, all the data from the test systems in a single department upload their test results into their departmental database configured by the ETCM system. After the test results are stored in the departmental server, the ETCM administrator can use the management tool to review all the test results. At this time, the administrator can mark some of the results for deletion. When all the test results have been reviewed, the administrator can choose to update the enterprise database with all the new test results in the departmental database. When this update is initiated, the ETCM software will only update the test results that have not been marked for deletion.

Figure 12:
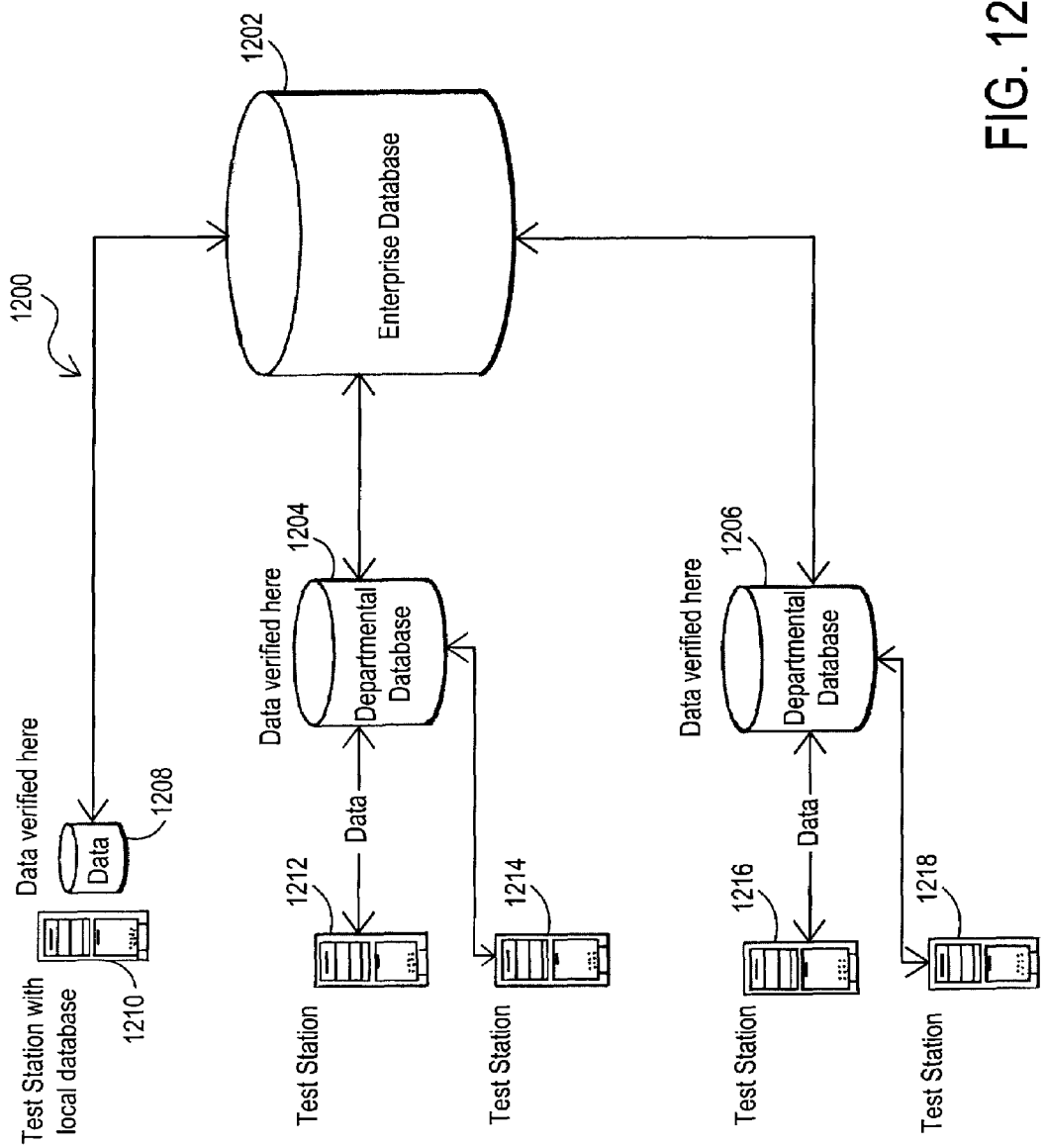
FIG. 12 is a block diagram for an embodiment of data staging for test data communications.

FIG. 12 provides a block diagram for example data-staging embodiments 1200. A test station 1210 with a local database 1208 is shown at the top of FIG. 12. For this test station 1210, data is stored and verified locally at the local database 1208. The verified data is then communicated between the local database 1208 and an enterprise level database 1202, which would typically be located in some desirable or central location within the company. Next, there are two pairs of test stations. Each pair, for example, could be test stations associated with a particular department of a company. For the middle pair of test stations 1212 and 1214, data is sent to and from a departmental database 1204, which can be a non-local database and can be centralized within the department. In the embodiment depicted, data is verified at this departmental database location. Data is then communicated between the departmental database 1204 and the enterprise database 1202. In the embodiment depicted, the bottom pair of test stations 1216 and 1218 is similar to the middle pair. From these test stations 1216 and 1218, data is sent to and from a departmental database 1206, which can be a non-local database and can be centralized within the department. Data is verified at this departmental database location and data is then communicated between the departmental database 1206 and the enterprise database 1202. As discussed above, therefore, data can be staged, as desired, between local databases, mid-level databases and an enterprise database to form hierarchical type storage of enterprise data. It is noted that the organization of this data among the various database levels could be implemented as desired depending upon the particular application to which the data staging architecture is applied.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

What is claim is:

1. An enterprise test data management system having a hierarchical test data model, comprising:
   a plurality of test systems configured to operate test software to conduct at least one test on a device to produce test data and to operate a data management software component, at least two of the test systems being directed to different test operations; and
   one or more server systems coupled to a database and configured to communicate with the plurality of test systems to receive the test data through operation of the data management software components on the plurality of test systems and to manage and store data in the database according to a test data model;
   wherein the test data model includes hierarchical data objects configured to store test data related information, the test data model comprising product test objects (PTOs) hierarchically positioned above result table objects (RTOs), which are configured to store information about test results.

2. The enterprise test data management system of claim 1, wherein the test data model comprises test procedure objects (TPOs), which are configured to store information about test procedures, configured hierarchically below product test objects (PTOs).

3. The enterprise test data management system of claim 2, wherein one or more TPOs are hierarchically positioned above one or more RTOs.

4. The enterprise test data management system of claim 2, wherein default TPO properties are defined such that each newly created TPO includes the default properties.

5. The enterprise test data management system of claim 2, wherein one or more TPOs is hierarchically positioned below another TPO.

6. The enterprise test data management system of claim 1, wherein one or more data objects within the test data model are linked such that data entered into one object is automatically propagated to linked objects.

7. The enterprise test data management system of claim 6, wherein a data field within a PTO is linked to a data field in one or more data objects hierarchically organized under the PTO.

8. The enterprise test data management system of claim 1, wherein one or more data objects within the test data model are linked such that data entered into one object is automatically usable by linked objects.

9. The enterprise test data management system of claim 8, wherein the test data model further comprises custom objects (COs) configured to store information about test operations, and wherein a CO is linked to one or more data objects within the test data model so that data stored in the CO can be used by the linked data object.

10. The enterprise test data management system of claim 1, wherein the test data model further comprises test station objects (TSOs) configured to store information about test stations.

11. The enterprise test data management system of claim 1, wherein the test data model further comprises custom objects (COs) configured to store information about test station configurations.

12. The enterprise test data management system of claim 1, wherein each PTO holds data corresponding to a distinct product test execution for a test system.

13. The enterprise test data management system of claim 1, wherein default PTO properties are defined such that each newly created PTO includes the default properties.

14. The enterprise test data management system of claim 1, further comprising a graphical user interface (GUI) through which information can be input to the database, the GUI including a first frame showing a structure for the hierarchical test data model and a second frame automatically showing one or more data input fields related to an object selected within the first frame.

15. The enterprise test data management system of claim 1, wherein one or more RTOs is hierarchically positioned below another RTO.

16. A method for managing enterprise test data using a hierarchical test data model, comprising:

operating a data management software component on a plurality of enterprise test systems, each test system being configured to operate test software to conduct at least one test on a device and to produce test data, and at least two of the test systems being directed to different test operations;

utilizing one or more server systems to communicate with the plurality of test systems to receive the test data from the test systems through operation of the data management software components on the plurality of test systems; and storing the test data from the test systems in a database utilizing a test data model, the test data model including hierarchical data objects configured to store test data related information, the test data model comprising product test objects (PTOs) hierarchically positioned above result table objects (RTOs), which are configured to store information about test results.

17. The method of claim 16, wherein the test data model further comprises test procedure objects (TPOs), which are configured to store information about test procedures, configured hierarchically below product test objects (PTOs).

18. The method of claim 17, wherein one or more TPOs are hierarchically positioned above one or more RTOs.

19. The method of claim 17, further comprising defining default TPO properties and including the default properties in each newly created TPO.

20. The method of claim 17, further comprising positioning one or more TPOs hierarchically positioned below another TPO.

21. The method of claim 16, further comprising linking one or more data objects within the test data model such that data entered into one object is automatically propagated to linked objects.

22. The method of claim 21, wherein a data field within a PTO is linked to a data field in one or more data objects hierarchically organized under the PTO.

23. The method of claim 16, further comprising linking one or more data objects within the test data model such that data entered into one object is automatically usable by linked objects.

24. The method of claim 23, wherein the test data model further comprises custom objects (COs) configured to store information about test operations, and wherein a CO is linked to one or more PTOs.

25. The method of claim 16, wherein the test data model further comprises station objects (TSOs), which are configured to store information about test stations, and custom objects (COs), which are configured to store information about test station operations.

26. The method of claim 16, further comprising defining default PTO properties and including the default properties in each newly created PTO.

27. The method of claim 16, further displaying a graphical user interface (GUI) through which information can be input to the database, the GUI including a first frame showing a structure for the hierarchical test data model and a second frame automatically showing one or more data input fields related to an object selected within the first frame.

28. The method of claim 16, further comprising positioning one or more RTOs hierarchically positioned below another RTO.

* * * * *